(12) United States Patent
Chen et al.

(10) Patent No.: US 11,259,042 B2
(45) Date of Patent: Feb. 22, 2022

(54) MOTION VECTOR DETERMINING METHOD AND APPARATUS

(71) Applicant: Huawei Technologies Co., Ltd., Shenzhen (CN)

(72) Inventors: Xu Chen, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/206,767

(22) Filed: Mar. 19, 2021

(65) Prior Publication Data

US 2021/0211712 A1 Jul. 8, 2021

Related U.S. Application Data

(63) Continuation of application No. PCT/CN2019/107305, filed on Sep. 23, 2019.

(30) Foreign Application Priority Data

Sep. 21, 2018 (CN) .......................... 201811109801.6
Dec. 14, 2018 (CN) .......................... 201811531038.6

(51) Int. Cl.
*H04N 19/52* (2014.01)
*H04N 19/176* (2014.01)
*H04N 19/567* (2014.01)

(52) U.S. Cl.
CPC ........... *H04N 19/52* (2014.11); *H04N 19/176* (2014.11); *H04N 19/567* (2014.11)

(58) Field of Classification Search
None
See application file for complete search history.

(56) References Cited

U.S. PATENT DOCUMENTS

| 2005/0265451 | A1 | 12/2005 | Shi et al. |
| 2007/0258521 | A1 | 11/2007 | Tsai et al. |
| 2020/0322625 | A1* | 10/2020 | Abe ..................... H04N 19/543 |

FOREIGN PATENT DOCUMENTS

| CN | 102263958 A | 11/2011 |
| CN | 102377992 A | 3/2012 |

(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

(Continued)

*Primary Examiner* — Lindsay J Uhl
(74) *Attorney, Agent, or Firm* — Conley Rose, P.C.

(57) ABSTRACT

A motion vector determining method includes a first matched distortion value between a forward prediction block and a backward prediction block of a current block is calculated. A matched distortion value between a first prediction block and a fifth prediction block, a matched distortion value between a second prediction block and a sixth prediction block, a matched distortion value between a third prediction block and a seventh prediction block, and a matched distortion value between a fourth prediction block and an eighth prediction block are calculated. A target forward prediction block and a target backward prediction block are determined based on a value relationship between the matched distortion values. A target motion vector of the current block is determined based on the target forward prediction block and the target backward prediction block.

20 Claims, 15 Drawing Sheets

(56) References Cited

FOREIGN PATENT DOCUMENTS

| | | |
|---|---|---|
| CN | 103338377 A | 10/2013 |
| CN | 103826133 A | 5/2014 |
| CN | 103841425 A | 6/2014 |
| CN | 104427345 A | 3/2015 |
| CN | 104041044 B | 11/2017 |
| EP | 2448266 A1 | 5/2012 |

OTHER PUBLICATIONS

ITU-T H.265"Series H: Audiovisual and Multimedia Systems Infrastructure of audiovisual services—Coding of moving video, High efficiency video coding," Feb. 2018, 692 pages.

Esenlik, S., et al., "CE9: DMVR with Bilateral Matching (Test2.9)," JVET-K0217_v1, Joint Video Experts Team (JVET) of ITU-T SG 16 WP 3 and ISO/IEC JTC 1/SC 29/WG11, 11th Meeting: Ljubljana, SI, Jul. 10-18, 2018, 6 pages.

\* cited by examiner

MOTION VECTOR DETERMINING METHOD AND APPARATUS

CROSS-REFERENCE TO RELATED APPLICATIONS

This application is a continuation of International Patent Application No. PCT/CN2019/107305 filed on Sep. 23, 2019, which claims priority to Chinese Patent Application No. 201811109801.6 filed on Sep. 21, 2018 and Chinese Patent Application No. 201811531038.6 filed on Dec. 14, 2018, all of which are hereby incorporated by reference in their entireties.

TECHNICAL FIELD

This application relates to video coding technologies, and in particular, to a motion vector determining method and apparatus.

BACKGROUND

Currently, unidirectional inter prediction and bi-directional inter prediction are used in a commonly used video coding method. In unidirectional inter prediction, a prediction block of a current block is generated based on only one reference block of the current block. In bi-directional inter prediction, the prediction block of the current block is generated based on at least two reference blocks, and the at least two reference blocks may be from a same reference frame or different reference frames. To enable a decoder side to successfully perform decoding, an encoder side needs to send motion information of the current block to the decoder side. The motion information of the current block may include a reference index value, a motion vector predictor (MVP), and a motion vector difference (MVD).

In a conventional technology, in a bi-directional inter prediction process, a decoder-side motion vector refinement (DMVR) technology is used to calculate a motion vector. When the motion vector is calculated, a block matching algorithm needs to be used to determine an optimal matching block (namely, a prediction block) of a current block. When the optimal matching block of the current block is determined, matching needs to be performed at least five times (to be specific, matching is separately performed in an upward direction, a downward direction, a leftward direction, a rightward direction, and an obliquely upward direction or an obliquely downward direction), and matching complexity is high. During each matching, a matched distortion value between prediction blocks needs to be calculated. In the conventional technology, when a matched distortion value is calculated, in addition to a difference between prediction blocks, an average between the prediction blocks also needs to be calculated. Consequently, calculation of matched distortion values is excessively complex.

SUMMARY

This application provides a motion vector determining method and apparatus, to reduce a calculation amount of matched distortion values and improve motion vector calculation efficiency.

According to a first aspect, an embodiment of this application provides a motion vector determining method, including calculating a first matched distortion value between a forward prediction block and a backward prediction block of a current block, calculating only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, where the first prediction block, the second prediction block, the third prediction block, and the fourth prediction block are respectively prediction blocks obtained by shifting the forward prediction block upward, downward, leftward, and rightward in a forward reference frame, and the fifth prediction block, the sixth prediction block, the seventh prediction block, and the eighth prediction block are respectively prediction blocks obtained by shifting the backward prediction block downward, upward, rightward, and leftward in a backward reference frame, determining a target forward prediction block and a target backward prediction block based on a value relationship between the first matched distortion value, the second matched distortion value, the third matched distortion value, the fourth matched distortion value, and the fifth matched distortion value, and determining a target motion vector of the current block based on the target forward prediction block and the target backward prediction block.

In the method, during each search, only matched distortion values between prediction blocks obtained by shifting the forward prediction block and the backward prediction block in the four directions (upward, downward, leftward, and rightward) need to be calculated. However, in a conventional technology, at least matched distortion values between prediction blocks obtained by shifting the forward prediction block and the backward prediction block in a total of five directions (upward, downward, leftward, rightward, and diagonal) need to be calculated during each search. In this way, a calculation amount of matched distortion values is reduced, and motion vector calculation efficiency is improved.

In a possible implementation, the determining a target forward prediction block and a target backward prediction block based on a value relationship between the first matched distortion value, the second matched distortion value, the third matched distortion value, the fourth matched distortion value, and the fifth matched distortion value includes determining a smallest matched distortion value among the first matched distortion value, the second matched distortion value, the third matched distortion value, the fourth matched distortion value, and the fifth matched distortion value, and determining that the forward prediction block, the first prediction block, the second prediction block, the third prediction block, or the fourth prediction block that each corresponds to the smallest matched distortion value is the target forward prediction block, and determining that the backward prediction block, the fifth prediction block, the sixth prediction block, the seventh prediction block, or the eighth prediction block that each corresponds to the smallest matched distortion value is the target backward prediction block.

In another possible implementation, the first prediction block, the second prediction block, the third prediction block, and the fourth prediction block are respectively prediction blocks obtained by shifting forward prediction block upward, downward, leftward, and rightward in the forward reference frame based on first sample accuracy, and the fifth prediction block, the sixth prediction block, the seventh prediction block, and the eighth prediction block are respectively prediction blocks obtained by shifting the backward prediction block downward, upward, rightward, and leftward in the backward reference frame based on the first sample accuracy, and the determining a target forward prediction block and a target backward prediction block based on a value relationship between the first matched distortion value, the second matched distortion value, the third matched distortion value, the fourth matched distortion value, and the fifth matched distortion value includes, when the second matched distortion value, the third matched distortion value, the fourth matched distortion value, and the fifth matched distortion value are all greater than or equal to the first matched distortion value, calculating only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block, where the ninth prediction block, the tenth prediction block, the eleventh prediction block, and the twelfth prediction block are respectively prediction blocks obtained by shifting the forward prediction block upward, downward, leftward, and rightward in the forward reference frame based on second sample accuracy, and the thirteenth prediction block, the fourteenth prediction block, the fifteenth prediction block, and the sixteenth prediction block are respectively prediction blocks obtained by shifting the backward prediction block downward, upward, rightward, and leftward in the backward reference frame based on the second sample accuracy, determining a smallest matched distortion value among the first matched distortion value, the sixth matched distortion value, the seventh matched distortion value, the eighth matched distortion value, and the ninth matched distortion value, and determining that the forward prediction block, the ninth prediction block, the tenth prediction block, the eleventh prediction block, or the twelfth prediction block that each corresponds to the smallest matched distortion value is the target forward prediction block, and determining that the backward prediction block, the thirteenth prediction block, the fourteenth prediction block, the fifteenth prediction block, or the sixteenth prediction block that each corresponds to the smallest matched distortion value is the target backward prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes a sum of absolute differences (SAD) between two prediction blocks, where the SAD is calculated according to the following formula:

$$SAD = \Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, L is a quantity of samples in a prediction block, and K is an average between the two prediction blocks, and K is calculated according to the following formula:

$$K = (\Sigma_{0 \leq i M <, 0 \leq j < N} P0[i][j] - \Sigma_{0 \leq i M <, 0 \leq j < N} P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, ninth prediction block, tenth prediction block, eleventh prediction block, or twelfth prediction block, P1[i][j] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, and corresponding positions of P0[i][j] and P1[i][j] in the two prediction blocks are the same.

In this manner, when K is calculated, the prediction block is sampled, so that a calculation amount of K is reduced, and calculation complexity of the matched distortion values is reduced.

In a possible implementation, the first sample accuracy is integer sample accuracy, and the second sample accuracy is half-sample accuracy.

When no prediction is matched by using the first sample accuracy, more refined second sample accuracy is used for search, so that the determined target forward prediction block and the determined target backward prediction block are more accurate.

In a possible implementation, the SAD is calculated according to the following formula:

$$SAD = \Sigma_{n=0}^{n=L-1}[abs(P0[n]-P1[n])],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, and L is a quantity of samples in a prediction block.

In this manner, when a matched distortion value is calculated, no average between two prediction blocks needs to be calculated, thereby simplifying calculation of the matched distortion value.

In a possible implementation, when P0[n] is a sample value of a sample in the sampled forward prediction block, first prediction block, second prediction block, third prediction block, fourth prediction block, ninth prediction block, tenth prediction block, eleventh prediction block, or twelfth prediction block, P1[n] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, corresponding positions of P0[n]

and P1[n] in the two sampled prediction blocks are the same, and L is a quantity of samples in a sampled prediction block.

In this manner, sampling reduces a calculation amount of the SAD and calculation complexity of the matched distortion values.

According to a second aspect, an embodiment of this application provides a motion vector determining method, including determining a combined prediction block based on a forward prediction block and a backward prediction block of a current block, calculating a first matched distortion value between the first prediction block and the combined prediction block, where the first prediction block is the forward prediction block or the backward prediction block, calculating only a second matched distortion value between a second prediction block and the combined prediction block, a third matched distortion value between a third prediction block and the combined prediction block, a fourth matched distortion value between a fourth prediction block and the combined prediction block, and a fifth matched distortion value between a fifth prediction block and the combined prediction block, where the second prediction block, the third prediction block, the fourth prediction block, and the fifth prediction block are respectively prediction blocks obtained by shifting the first prediction block upward, downward, leftward, and rightward in a reference frame, determining a target prediction block based on a value relationship between the first matched distortion value, the second matched distortion value, the third matched distortion value, the fourth matched distortion value, and the fifth matched distortion value, and determining a target motion vector of the current block based on the target prediction block.

In the method, during each search, only matched distortion values between prediction blocks obtained by shifting the forward prediction block and the backward prediction block in the four directions (upward, downward, leftward, and rightward) need to be calculated. However, in a conventional technology, at least matched distortion values between prediction blocks obtained by shifting the forward prediction block and the backward prediction block in a total of five directions (upward, downward, leftward, rightward, and diagonal) need to be calculated during each search. In this way, a calculation amount of matched distortion values is reduced, and motion vector calculation efficiency is improved.

In a possible implementation, the determining a target prediction block based on a value relationship between the first matched distortion value, the second matched distortion value, the third matched distortion value, the fourth matched distortion value, and the fifth matched distortion value includes, when the first prediction block is the forward prediction block, determining a first smallest matched distortion value among the first matched distortion value, the second matched distortion value, the third matched distortion value, the fourth matched distortion value, and the fifth matched distortion value that correspond to the forward prediction block, determining that the forward prediction block, the second prediction block, the third prediction block, the fourth prediction block, or the fifth prediction block that each corresponds to the first smallest matched distortion value is the target prediction block, when the first prediction block is the backward prediction block, determining a second smallest matched distortion value among the first matched distortion value, the second matched distortion value, the third matched distortion value, the fourth matched distortion value, and the fifth matched distortion value that correspond to the backward prediction block, and determining that the backward prediction block, the second prediction block, the third prediction block, the fourth prediction block, or the fifth prediction block that each corresponds to the second smallest matched distortion value is the target prediction block.

In another possible implementation, the second prediction block, the third prediction block, the fourth prediction block, and the fifth prediction block are respectively prediction blocks obtained by shifting the first prediction block upward, downward, leftward, and rightward in the reference frame based on first sample accuracy, and the determining a target prediction block based on a value relationship between the first matched distortion value, the second matched distortion value, the third matched distortion value, the fourth matched distortion value, and the fifth matched distortion value includes, when the second matched distortion value, the third matched distortion value, the fourth matched distortion value, and the fifth matched distortion value are all greater than or equal to the first matched distortion value, calculating only a sixth matched distortion value between a sixth prediction block and the combined prediction block, a seventh matched distortion value between a seventh prediction block and the combined prediction block, an eighth matched distortion value between an eighth prediction block and the combined prediction block, and a ninth matched distortion value between a ninth prediction block and the combined prediction block, where the sixth prediction block, the seventh prediction block, the eighth prediction block, and the ninth prediction block are respectively prediction blocks obtained by shifting the first prediction block upward, downward, leftward, and rightward in the reference frame based on second sample accuracy, when the first prediction block is the forward prediction block, determining a first smallest matched distortion value among the first matched distortion value, the sixth matched distortion value, the seventh matched distortion value, the eighth matched distortion value, and the ninth matched distortion value, determining that the forward prediction block, the sixth prediction block, the seventh prediction block, the eighth prediction block, or the ninth prediction block that each corresponds to the first smallest matched distortion value is the target prediction block, when the first prediction block is the backward prediction block, determining a second smallest matched distortion value among the first matched distortion value, the sixth matched distortion value, the seventh matched distortion value, the eighth matched distortion value, and the ninth matched distortion value, and determining that the backward prediction block, the sixth prediction block, the seventh prediction block, the eighth prediction block, or the ninth prediction block that each corresponds to the second smallest matched distortion value is the target prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes a sum of absolute differences SAD between two prediction blocks, where the SAD is calculated according to the following formula:

$$SAD=\Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, L is a quantity of samples in a prediction block, and K is an average between the two prediction blocks, and K is calculated according to the following formula:

$$K=(\Sigma_{0\leq iM<,0\leq j<N}P0[i][i]-\Sigma_{0\leq iM<,0\leq j<N}P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, sixth prediction block, seventh prediction block, eighth prediction block, or ninth prediction block, P0[i][j] is a sample value of a sample in the sampled combined prediction block, and corresponding positions of P0[i][j] and P1[i][j] in the two prediction blocks are the same.

In this manner, when K is calculated, the prediction block is sampled, so that a calculation amount of K is reduced, and calculation complexity of the matched distortion values is reduced.

In a possible implementation, the first sample accuracy is integer sample accuracy, and the second sample accuracy is half-sample accuracy.

When no prediction is matched by using the first sample accuracy, more refined second sample accuracy is used for search, so that the determined target forward prediction block and the determined target backward prediction block are more accurate.

In a possible implementation, the SAD is calculated according to the following formula:

$$SAD=\Sigma_{n=0}^{n=L-1}[abs(P0[n]-P1[n])],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, and L is a quantity of samples in a prediction block.

In this manner, when a matched distortion value is calculated, no average between two prediction blocks needs to be calculated, thereby simplifying calculation of the matched distortion value.

In a possible implementation, P0[n] is a sample value of a sample in the sampled first prediction block, second prediction block, third prediction block, fourth prediction block, fifth prediction block, sixth prediction block, seventh prediction block, eighth prediction block, or ninth prediction block, P1[n] is a sample value of a sample in the sampled combined prediction block, corresponding positions of P0[n] and P1[n] in the two sampled prediction blocks are the same, and L is a quantity of samples in a sampled prediction block.

In this manner, sampling reduces a calculation amount of the SAD and calculation complexity of the matched distortion values.

According to a third aspect, an embodiment of this application provides a motion vector determining method, including calculating a first matched distortion value between a forward prediction block and a backward prediction block of a current block, calculating a second matched distortion value between a first prediction block and a sixth prediction block, a third matched distortion value between a second prediction block and a seventh prediction block, a fourth matched distortion value between a third prediction block and an eighth prediction block, a fifth matched distortion value between a fourth prediction block and a ninth prediction block, and a sixth matched distortion value between a fifth prediction block and a tenth prediction block, where the first prediction block, the second prediction block, the third prediction block, the fourth prediction block, and the fifth prediction block are respectively prediction blocks obtained by shifting the forward prediction block upward, downward, leftward, rightward, and in a diagonal direction in a forward reference frame, the sixth prediction block, the seventh prediction block, the eighth prediction block, the ninth prediction block, and the tenth prediction block are respectively prediction blocks obtained by shifting the backward prediction block downward, upward, rightward, leftward, and in a reverse direction of the diagonal direction in a backward reference frame, when the diagonal direction is a top-left, bottom-left, top-right, or bottom-right direction, the reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes an SAD between two prediction blocks, where the SAD is calculated according to the following formula:

$$SAD=\Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, or the fifth prediction block, P1[n] is correspondingly a sample value of a sample in the backward prediction block, the sixth prediction block, the seventh prediction block, the eighth prediction block, the ninth prediction block, or the tenth prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0\leq iM<,0\leq j<N}P0[i][i]-\Sigma_{0\leq iM<,0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, or fifth prediction block, P1[i][j] is correspondingly a sample value of a sample in the sampled backward prediction block, sixth prediction block, seventh prediction block, eighth prediction block, ninth prediction block, or tenth prediction block, and corresponding positions of P0[i][j] and P1[i][j] in the two prediction blocks are the same, determining a target forward prediction block and a target backward prediction block based on a value relationship between the first matched distortion value, the second matched distortion value, the third matched distortion value, the fourth matched distortion value, the fifth matched distortion value, and the sixth matched distortion value, and determining a target motion vector of the current block based on the target forward prediction block and the target backward prediction block.

In this manner, when K is calculated, the prediction block is sampled, so that a calculation amount of K is reduced, and calculation complexity of the matched distortion values is reduced.

In a possible implementation, the determining a target forward prediction block and a target backward prediction block based on a value relationship between the first matched distortion value, the second matched distortion value, the third matched distortion value, the fourth matched distortion value, the fifth matched distortion value, and the sixth matched distortion value includes determining a smallest matched distortion value among the first matched distortion value, the second matched distortion value, the third matched distortion value, the fourth matched distortion value, the fifth matched distortion value, and the sixth matched distortion value, and determining that the forward prediction block, the first prediction block, the second prediction block, the third prediction block, the fourth prediction block, or the fifth prediction block that each corresponds to the smallest matched distortion value is the target forward prediction block, and determining that the backward prediction block, the sixth prediction block, the seventh prediction block, the eighth prediction block, the ninth prediction block, or the tenth prediction block that each corresponds to the smallest matched distortion value is the target backward prediction block.

In a possible implementation, the first prediction block, the second prediction block, the third prediction block, the fourth prediction block, and the fifth prediction block are respectively prediction blocks obtained by shifting the forward prediction block upward, downward, leftward, rightward, and in the diagonal direction in the forward reference frame based on first sample accuracy, the sixth prediction block, the seventh prediction block, the eighth prediction block, the ninth prediction block, and the tenth prediction block are respectively prediction blocks obtained by shifting the backward prediction block downward, upward, rightward, leftward, and in the reverse direction of the diagonal direction in the backward reference frame based on the first sample accuracy, and the determining a target forward prediction block and a target backward prediction block based on a value relationship between the first matched distortion value, the second matched distortion value, the third matched distortion value, the fourth matched distortion value, the fifth matched distortion value, and the sixth matched distortion value includes, when the second matched distortion value, the third matched distortion value, the fourth matched distortion value, the fifth matched distortion value, and the sixth matched distortion value are all greater than or equal to the first matched distortion value, calculating a seventh matched distortion value between an eleventh prediction block and a sixteenth prediction block, an eighth matched distortion value between a twelfth prediction block and a seventeenth prediction block, a ninth matched distortion value between a thirteenth prediction block and an eighteenth prediction block, a tenth matched distortion value between a fourteenth prediction block and a nineteenth prediction block, and an eleventh matched distortion value between a fifteenth prediction block and a twentieth prediction block, where the eleventh prediction block, the twelfth prediction block, the thirteenth prediction block, the fourteenth prediction block, and the fifteenth prediction block are respectively prediction blocks obtained by shifting the forward prediction block upward, downward, leftward, rightward, and in the diagonal direction in the forward reference frame based on second sample accuracy, and the sixteenth prediction block, the seventeenth prediction block, the eighteenth prediction block, the nineteenth prediction block, and the twentieth prediction block are respectively prediction blocks obtained by shifting the backward prediction block downward, upward, rightward, leftward, and in the reverse direction of the diagonal direction in the backward reference frame based on the second sample accuracy, determining a smallest matched distortion value among the first matched distortion value, the seventh matched distortion value, the eighth matched distortion value, the ninth matched distortion value, the tenth matched distortion value, and the eleventh matched distortion value, and determining that the forward prediction block, the eleventh prediction block, the twelfth prediction block, the thirteenth prediction block, the fourteenth prediction block, or the fifteenth prediction block that each corresponds to the smallest matched distortion value is the target forward prediction block, and determining that the backward prediction block, the sixteenth prediction block, the seventeenth prediction block, the eighteenth prediction block, the nineteenth prediction block, or the twentieth prediction block that each corresponds to the smallest matched distortion value is the target backward prediction block.

In a possible implementation, the first sample accuracy is integer sample accuracy, and the second sample accuracy is half-sample accuracy.

When no prediction is matched by using the first sample accuracy, more refined second sample accuracy is used for search, so that the determined target forward prediction block and the determined target backward prediction block are more accurate.

In a possible implementation, when P0[n] is a sample value of a sample in the sampled forward prediction block, first prediction block, second prediction block, third prediction block, fourth prediction block, or fifth prediction block, P1[n] is correspondingly a sample value of a sample in the sampled backward prediction block, sixth prediction block, seventh prediction block, eighth prediction block, ninth prediction block, or tenth prediction block, corresponding positions of P0[n] and P1[n] in the two sampled prediction blocks are the same, and L is a quantity of samples in a sampled prediction block.

In this manner, sampling reduces a calculation amount of the SAD and calculation complexity of the matched distortion values.

According to a fourth aspect, an embodiment of this application provides a motion vector determining method, including determining a combined prediction block based on a forward prediction block and a backward prediction block of a current block, calculating a first matched distortion value between the first prediction block and the combined prediction block, where the first prediction block is the forward prediction block or the backward prediction block, calculating a second matched distortion value between a second prediction block and the combined prediction block, a third matched distortion value between a third prediction block and the combined prediction block, a fourth matched distortion value between a fourth prediction block and the combined prediction block, a fifth matched distortion value between a fifth prediction block and the combined prediction block, and a sixth matched distortion value between a sixth prediction block and the combined prediction block, where the second prediction block, the third prediction block, the fourth prediction block, the fifth prediction block, and the sixth prediction block are respectively prediction blocks obtained by shifting the first prediction block upward, downward, leftward, rightward, and in a diagonal direction in a reference frame, when the diagonal direction is a top-left, bottom-left, top-right, or bottom-right direction, a reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes a sum of absolute differences SAD between two prediction blocks, where the SAD is calculated according to the following formula:

$$SAD=\Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, or the sixth prediction block, P1[n] is a sample value of a sample in the combined prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0\leq i M<,0\leq j<N}P0[i][j]-\Sigma_{0\leq i M<m0\leq j<N}P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, or sixth prediction block, P1[i][j] is a sample value of a sample in the sampled combined prediction block, and corresponding positions of P0[i][j] and P1[i][j] in the two prediction blocks are the same, determining a target prediction block based on a value relationship between the first matched distortion value, the second matched distortion value, the third matched distortion value, the fourth matched distortion value, the fifth matched distortion value, and the sixth matched distortion value, and determining a target motion vector of the current block based on the target prediction block.

In this manner, when a matched distortion value is calculated, no average between two prediction blocks needs to be calculated, thereby simplifying calculation of the matched distortion value.

In a possible implementation, the determining a target prediction block based on a value relationship between the first matched distortion value, the second matched distortion value, the third matched distortion value, the fourth matched distortion value, the fifth matched distortion value, and the sixth matched distortion value includes, when the first prediction block is the forward prediction block, determining a first smallest matched distortion value among the first matched distortion value, the second matched distortion value, the third matched distortion value, the fourth matched distortion value, the fifth matched distortion value, and the sixth matched distortion value that correspond to the forward prediction block, determining that the forward prediction block, the second prediction block, the third prediction block, the fourth prediction block, the fifth prediction block, or the sixth prediction block that each corresponds to the first smallest matched distortion value is the target prediction block, when the first prediction block is the backward prediction block, determining a second smallest matched distortion value among the first matched distortion value, the second matched distortion value, the third matched distortion value, the fourth matched distortion value, the fifth matched distortion value, and the sixth matched distortion value that correspond to the backward prediction block, and determining that the backward prediction block, the second prediction block, the third prediction block, the fourth prediction block, the fifth prediction block, or the sixth prediction block that each corresponds to the second smallest matched distortion value is the target prediction block.

In a possible implementation, the second prediction block, the third prediction block, the fourth prediction block, the fifth prediction block, and the sixth prediction block are respectively prediction block obtained by shifting the first prediction block upward, downward, leftward, rightward, and in the diagonal direction in the reference frame based on first sample accuracy, and the determining a target prediction block based on a value relationship between the first matched distortion value, the second matched distortion value, the third matched distortion value, the fourth matched distortion value, the fifth matched distortion value, and the sixth matched distortion value includes, when the second matched distortion value, the third matched distortion value, the fourth matched distortion value, the fifth matched distortion value, and the sixth matched distortion value are all greater than or equal to the first matched distortion value, calculating a seventh matched distortion value between a seventh prediction block and the combined prediction block, an eighth matched distortion value between an eighth prediction block and the combined prediction block, a ninth matched distortion value between a ninth prediction block and the combined prediction block, a tenth matched distortion value between a tenth prediction block and the combined prediction block, and an eleventh matched distortion value between an eleventh prediction block and the combined prediction block, where the seventh prediction block, the eighth prediction block, the ninth prediction block, the tenth prediction block, and the eleventh prediction block are respectively prediction block obtained by shifting the first prediction block upward, downward, leftward, rightward, and in the diagonal direction in the reference frame based on second sample accuracy, when the first prediction block is the forward prediction block, determining a first smallest matched distortion value among the first matched distortion value, the seventh matched distortion value, the eighth matched distortion value, the ninth matched distortion value, the tenth matched distortion value, and the eleventh matched distortion value, determining that the forward prediction block, the seventh prediction block, the eighth prediction block, the ninth prediction block, the tenth prediction block, or the eleventh prediction block that each corresponds to the first smallest matched distortion value is the target prediction block, when the first prediction block is the backward prediction block, determining a second smallest matched distortion value among the first matched distortion value, the seventh matched distortion value, the eighth matched distortion value, the ninth matched distortion value, the tenth matched distortion value, and the eleventh matched distortion value, and determining that the backward prediction block, the seventh prediction block, the eighth prediction block, the ninth prediction block, the tenth prediction block, or the eleventh prediction block that each corresponds to the second smallest matched distortion value is the target prediction block.

In a possible implementation, the first sample accuracy is integer sample accuracy, and the second sample accuracy is half-sample accuracy.

In this manner, sampling reduces a calculation amount of the SAD and calculation complexity of the matched distortion values.

In a possible implementation, P0[n] is a sample value of a sample in the sampled first prediction block, second prediction block, third prediction block, fourth prediction block, fifth prediction block, or sixth prediction block, P1[n] is a sample value of a sample in the sampled combined prediction block, corresponding positions of P0[n] and P1[n] in the two sampled prediction blocks are the same, and L is a quantity of samples in a sampled prediction block.

In this manner, sampling reduces a calculation amount of the SAD and calculation complexity of the matched distortion values.

According to a fifth aspect, an embodiment of this application provides a motion vector determining apparatus, including a calculation module, configured to calculate a first matched distortion value between a forward prediction block and a backward prediction block of a current block, where the calculation module is further configured to calculate only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, where the first prediction block, the second prediction block, the third prediction block, and the fourth prediction block are respectively prediction blocks obtained by shifting the forward prediction block upward, downward, leftward, and rightward in a forward reference frame, and the fifth prediction block, the sixth prediction block, the seventh prediction block, and the eighth prediction block are respectively prediction blocks obtained by shifting the backward prediction block downward, upward, rightward, and leftward in a backward reference frame, a first determining module, configured to determine a target forward prediction block and a target backward prediction block based on a value relationship between the first matched distortion value, the second matched distortion value, the third matched distortion value, the fourth matched distortion value, and the fifth matched distortion value, and a second determining module, configured to determine a target motion vector of the current block based on the target forward prediction block and the target backward prediction block.

In a possible implementation, the first determining module is specifically configured to determine a smallest matched distortion value among the first matched distortion value, the second matched distortion value, the third matched distortion value, the fourth matched distortion value, and the fifth matched distortion value, and determine that the forward prediction block, the first prediction block, the second prediction block, the third prediction block, or the fourth prediction block that each corresponds to the smallest matched distortion value is the target forward prediction block, and determine that the backward prediction block, the fifth prediction block, the sixth prediction block, the seventh prediction block, or the eighth prediction block that each corresponds to the smallest matched distortion value is the target backward prediction block.

In a possible implementation, the first prediction block, the second prediction block, the third prediction block, and the fourth prediction block are respectively prediction blocks obtained by shifting the forward prediction block upward, downward, leftward, and rightward in the forward reference frame based on first sample accuracy, and the fifth prediction block, the sixth prediction block, the seventh prediction block, and the eighth prediction block are respectively prediction blocks obtained by shifting the backward prediction block downward, upward, rightward, and leftward in the backward reference frame based on the first sample accuracy.

The calculation module is further configured to, when the second matched distortion value, the third matched distortion value, the fourth matched distortion value, and the fifth matched distortion value are all greater than or equal to the first matched distortion value, calculate only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block, where the ninth prediction block, the tenth prediction block, the eleventh prediction block, and the twelfth prediction block are respectively prediction blocks obtained by shifting the forward prediction block upward, downward, leftward, and rightward in the forward reference frame based on second sample accuracy, and the thirteenth prediction block, the fourteenth prediction block, the fifteenth prediction block, and the sixteenth prediction block are respectively prediction blocks obtained by shifting the backward prediction block downward, upward, rightward, and leftward in the backward reference frame based on the second sample accuracy.

The first determining module is specifically configured to determine a smallest matched distortion value among the first matched distortion value, the sixth matched distortion value, the seventh matched distortion value, the eighth matched distortion value, and the ninth matched distortion value, and determine that the forward prediction block, the ninth prediction block, the tenth prediction block, the eleventh prediction block, or the twelfth prediction block that each corresponds to the smallest matched distortion value is the target forward prediction block, and determine that the backward prediction block, the thirteenth prediction block, the fourteenth prediction block, the fifteenth prediction block, or the sixteenth prediction block that each corresponds to the smallest matched distortion value is the target backward prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes an SAD between two prediction blocks, where the SAD is calculated according to the following formula:

$$SAD = \sum_{n=0}^{n=L-1} [\text{abs}(P0[n] - P1[n] - K)],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, L is a quantity of samples in a prediction block, and K is an average between the two prediction blocks, and K is calculated according to the following formula:

$$K=(\Sigma_{0\leq i M<,0\leq j<N}P0[i][j]-\Sigma_{0\leq i M<,0 j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, ninth prediction block, tenth prediction block, eleventh prediction block, or twelfth prediction block, P1[i][j] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, and corresponding positions of P0[i][j] and P1[i][j] in the two prediction blocks are the same.

In a possible implementation, the first sample accuracy is integer sample accuracy, and the second sample accuracy is half-sample accuracy.

In a possible implementation, the SAD is calculated according to the following formula:

$$SAD=\Sigma_{n=0}^{n=L-1}[abs(P0[n]-P1[n])],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, and L is a quantity of samples in a prediction block.

In a possible implementation, when P0[n] is a sample value of a sample in the sampled forward prediction block, first prediction block, second prediction block, third prediction block, fourth prediction block, ninth prediction block, tenth prediction block, eleventh prediction block, or twelfth prediction block, P1[n] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, corresponding positions of P0[n] and P1[n] in the two sampled prediction blocks are the same, and L is a quantity of samples in a sampled prediction block.

According to a sixth aspect, an embodiment of this application provides a motion vector determining apparatus, including a combination module, configured to determine a combined prediction block based on a forward prediction block and a backward prediction block of a current block; a calculation module, configured to calculate a first matched distortion value between the first prediction block and the combined prediction block, where the first prediction block is the forward prediction block or the backward prediction block, and the calculation module is further configured to calculate only a second matched distortion value between a second prediction block and the combined prediction block, a third matched distortion value between a third prediction block and the combined prediction block, a fourth matched distortion value between a fourth prediction block and the combined prediction block, and a fifth matched distortion value between a fifth prediction block and the combined prediction block, where the second prediction block, the third prediction block, the fourth prediction block, and the fifth prediction block are respectively prediction blocks obtained by shifting the first prediction block upward, downward, leftward, and rightward in a reference frame, a first determining module, configured to determine a target prediction block based on a value relationship between the first matched distortion value, the second matched distortion value, the third matched distortion value, the fourth matched distortion value, and the fifth matched distortion value, and a second determining module, configured to determine a target motion vector of the current block based on the target prediction block.

In a possible implementation, the first determining module is specifically configured to, when the first prediction block is the forward prediction block, determine a first smallest matched distortion value among the first matched distortion value, the second matched distortion value, the third matched distortion value, the fourth matched distortion value, and the fifth matched distortion value that correspond to the forward prediction block, determine that the forward prediction block, the second prediction block, the third prediction block, the fourth prediction block, or the fifth prediction block that each corresponds to the first smallest matched distortion value is the target prediction block, when the first prediction block is the backward prediction block, determine a second smallest matched distortion value among the first matched distortion value, the second matched distortion value, the third matched distortion value, the fourth matched distortion value, and the fifth matched distortion value that correspond to the backward prediction block, and determine that the backward prediction block, the second prediction block, the third prediction block, the fourth prediction block, or the fifth prediction block that each corresponds to the second smallest matched distortion value is the target prediction block.

In a possible implementation, the second prediction block, the third prediction block, the fourth prediction block, and the fifth prediction block are respectively prediction blocks obtained by shifting the first prediction block upward, downward, leftward, and rightward in the reference frame based on first sample accuracy.

The calculation module is further configured to, when the second matched distortion value, the third matched distortion value, the fourth matched distortion value, and the fifth matched distortion value are all greater than or equal to the first matched distortion value, calculate only a sixth matched distortion value between a sixth prediction block and the combined prediction block, a seventh matched distortion value between a seventh prediction block and the combined prediction block, an eighth matched distortion value between an eighth prediction block and the combined prediction block, and a ninth matched distortion value between a ninth prediction block and the combined prediction block, where the sixth prediction block, the seventh prediction block, the eighth prediction block, and the ninth prediction block are respectively prediction blocks obtained by shifting the first prediction block upward, downward, leftward, and rightward in the reference frame based on second sample accuracy.

The first determining module is specifically configured to, when the first prediction block is the forward prediction block, determine a first smallest matched distortion value among the first matched distortion value, the sixth matched distortion value, the seventh matched distortion value, the eighth matched distortion value, and the ninth matched distortion value, determine that the forward prediction block, the sixth prediction block, the seventh prediction block, the eighth prediction block, or the ninth prediction block that each corresponds to the first smallest matched distortion value is the target prediction block, when the first prediction block is the backward prediction block, determine a second smallest matched distortion value among the first matched distortion value, the sixth matched distortion value, the seventh matched distortion value, the eighth matched distortion value, and the ninth matched distortion value, and determine that the backward prediction block, the sixth prediction block, the seventh prediction block, the eighth prediction block, or the ninth prediction block that each corresponds to the second smallest matched distortion value is the target prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes an SAD between two prediction blocks, where the SAD is calculated according to the following formula:

$$SAD=\Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, L is a quantity of samples in a prediction block, and K is an average between the two prediction blocks, and K is calculated according to the following formula:

$$K=(\Sigma_{0\leq i M<0,\leq j<N}P0[i][j]-\Sigma_{0\leq iM<,0\leq j<N}P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, sixth prediction block, seventh prediction block, eighth prediction block, or ninth prediction block, P1[i][j] is a sample value of a sample in the sampled combined prediction block, and corresponding positions of P0[i][j] and P1[i][j] in the two prediction blocks are the same.

In a possible implementation, the first sample accuracy is integer sample accuracy, and the second sample accuracy is half-sample accuracy.

In a possible implementation, the SAD is calculated according to the following formula:

$$SAD=\Sigma_{n=0}^{n=L-1}[abs(P0[n]-P1[n])],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, and L is a quantity of samples in a prediction block.

In a possible implementation, P0[n] is a sample value of a sample in the sampled first prediction block, second prediction block, third prediction block, fourth prediction block, fifth prediction block, sixth prediction block, seventh prediction block, eighth prediction block, or ninth prediction block, P1[n] is a sample value of a sample in the sampled combined prediction block, corresponding positions of P0[n] and P1[n] in the two sampled prediction blocks are the same, and L is a quantity of samples in a sampled prediction block.

According to a seventh aspect, an embodiment of this application provides a motion vector determining apparatus, including a calculation module, configured to calculate a first matched distortion value between a forward prediction block and a backward prediction block of a current block, where the calculation module is further configured to calculate a second matched distortion value between a first prediction block and a sixth prediction block, a third matched distortion value between a second prediction block and a seventh prediction block, a fourth matched distortion value between a third prediction block and an eighth prediction block, a fifth matched distortion value between a fourth prediction block and a ninth prediction block, and a sixth matched distortion value between a fifth prediction block and a tenth prediction block, where the first prediction block, the second prediction block, the third prediction block, the fourth prediction block, and the fifth prediction block are respectively prediction blocks obtained by shifting the forward prediction block upward, downward, leftward, rightward, and in a diagonal direction in a forward reference frame, the sixth prediction block, the seventh prediction block, the eighth prediction block, the ninth prediction block, and the tenth prediction block are respectively prediction blocks obtained by shifting the backward prediction block downward, upward, rightward, leftward, and in a reverse direction of the diagonal direction in a backward reference frame, when the diagonal direction is a top-left, bottom-left, top-right, or bottom-right direction, the reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes a sum of absolute differences SAD between two prediction blocks, where the SAD is calculated according to the following formula:

$$SAD=\Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, or the fifth prediction block, P1[n] is correspondingly a sample value of a sample in the backward prediction block, the sixth prediction block, the seventh prediction block, the eighth prediction block, the ninth prediction block, or the tenth prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0\leq i M<,0\leq j<N}P0[i][j]-\Sigma_{0\leq i M<,0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, or fifth prediction block, P1[i][j] is correspondingly a sample value of a sample in the sampled backward prediction block, sixth prediction block, seventh prediction block, eighth prediction block, ninth prediction block, or tenth prediction block, and corresponding positions of P0[i][j] and P1[i][j] in the two prediction blocks are the same, a first determining module, configured to determine a target forward prediction block and a target backward prediction block based on a value relationship between the first matched distortion value, the second matched distortion value, the third matched distortion value, the fourth matched distortion value, the fifth matched distortion value, and the sixth matched distortion value, and a second determining module, configured to determine a target motion vector of the current block based on the target forward prediction block and the target backward prediction block.

In a possible implementation, the first determining module is specifically configured to determine a smallest matched distortion value among the first matched distortion value, the second matched distortion value, the third matched distortion value, the fourth matched distortion value, the fifth matched distortion value, and the sixth matched distortion value, and determine that the forward prediction block, the first prediction block, the second prediction block, the third prediction block, the fourth prediction block, or the fifth prediction block that each corresponds to the smallest matched distortion value is the target forward prediction block, and determine that the backward prediction block, the sixth prediction block, the seventh prediction block, the eighth prediction block, the ninth prediction block, or the tenth prediction block that each corresponds to the smallest matched distortion value is the target backward prediction block.

In a possible implementation, the first prediction block, the second prediction block, the third prediction block, the fourth prediction block, and the fifth prediction block are respectively prediction blocks obtained by shifting the forward prediction block upward, downward, leftward, rightward, and in the diagonal direction in the forward reference frame based on first sample accuracy, and the sixth prediction block, the seventh prediction block, the eighth prediction block, the ninth prediction block, and the tenth prediction block are respectively prediction blocks obtained by shifting the backward prediction block downward, upward, rightward, leftward, and in the reverse direction of the diagonal direction in the backward reference frame based on the first sample accuracy.

The calculation module is further configured to, when the second matched distortion value, the third matched distortion value, the fourth matched distortion value, the fifth matched distortion value, and the sixth matched distortion value are all greater than or equal to the first matched distortion value, calculate a seventh matched distortion value between an eleventh prediction block and a sixteenth prediction block, an eighth matched distortion value between a twelfth prediction block and a seventeenth prediction block, a ninth matched distortion value between a thirteenth prediction block and an eighteenth prediction block, a tenth matched distortion value between a fourteenth prediction block and a nineteenth prediction block, and an eleventh matched distortion value between a fifteenth prediction block and a twentieth prediction block, where the eleventh prediction block, the twelfth prediction block, the thirteenth prediction block, the fourteenth prediction block, and the fifteenth prediction block are respectively prediction blocks obtained by shifting the forward prediction block upward, downward, leftward, rightward, and in the diagonal direction in the forward reference frame based on second sample accuracy, and the sixteenth prediction block, the seventeenth prediction block, the eighteenth prediction block, the nineteenth prediction block, and the twentieth prediction block are respectively prediction blocks obtained by shifting the backward prediction block downward, upward, rightward, leftward, and in the reverse direction of the diagonal direction in the backward reference frame based on the second sample accuracy.

The first determining module is specifically configured to determine a smallest matched distortion value among the first matched distortion value, the seventh matched distortion value, the eighth matched distortion value, the ninth matched distortion value, the tenth matched distortion value, and the eleventh matched distortion value, and determine that the forward prediction block, the eleventh prediction block, the twelfth prediction block, the thirteenth prediction block, the fourteenth prediction block, or the fifteenth prediction block that each corresponds to the smallest matched distortion value is the target forward prediction block, and determine that the backward prediction block, the sixteenth prediction block, the seventeenth prediction block, the eighteenth prediction block, the nineteenth prediction block, or the twentieth prediction block that each corresponds to the smallest matched distortion value is the target backward prediction block.

In a possible implementation, the first sample accuracy is integer sample accuracy, and the second sample accuracy is half-sample accuracy.

In a possible implementation, when P0[n] is a sample value of a sample in the sampled forward prediction block, first prediction block, second prediction block, third prediction block, fourth prediction block, or fifth prediction block, P1[n] is correspondingly a sample value of a sample in the sampled backward prediction block, sixth prediction block, seventh prediction block, eighth prediction block, ninth prediction block, or tenth prediction block, corresponding positions of P0[n] and P1[n] in the two sampled prediction blocks are the same, and L is a quantity of samples in a sampled prediction block.

According to an eighth aspect, an embodiment of this application provides a motion vector determining apparatus, including a combination module, configured to determine a combined prediction block based on a forward prediction block and a backward prediction block of a current block, a calculation module, configured to calculate a first matched distortion value between the first prediction block and the combined prediction block, where the first prediction block is the forward prediction block or the backward prediction block, and the calculation module is further configured to calculate a second matched distortion value between a second prediction block and the combined prediction block, a third matched distortion value between a third prediction block and the combined prediction block, a fourth matched distortion value between a fourth prediction block and the combined prediction block, a fifth matched distortion value between a fifth prediction block and the combined prediction block, and a sixth matched distortion value between a sixth prediction block and the combined prediction block, where the second prediction block, the third prediction block, the fourth prediction block, the fifth prediction block, and the sixth prediction block are respectively prediction blocks obtained by shifting the first prediction block upward, downward, leftward, rightward, and in a diagonal direction in a reference frame, when the diagonal direction is a top-left, bottom-left, top-right, or bottom-right direction, a reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes an SAD between two prediction blocks, where the SAD is calculated according to the following formula:

$$SAD = \Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, or the sixth prediction block, P1[n] is a sample value of a sample in the combined prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0 \leq i M<, 0 \leq j<N} P0[i][j] - \Sigma_{0 \leq i M<, 0 \leq j<N} P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, or sixth prediction block, P1[i][j] is a sample value of a sample in the sampled combined prediction block, and corresponding positions of P0[i][j] and P1[i][j] in the two prediction blocks are the same, a first determining module, configured to determine a target prediction block based on a value relationship between the first matched distortion value, the second matched distortion value, the third matched distortion value, the fourth matched distortion value, the fifth matched distortion value, and the sixth matched distortion value, and a second determining module, configured to determine a target motion vector of the current block based on the target prediction block.

In a possible implementation, the first determining module is specifically configured to, when the first prediction block is the forward prediction block, determine a first smallest matched distortion value among the first matched distortion value, the second matched distortion value, the third matched distortion value, the fourth matched distortion value, the fifth matched distortion value, and the sixth matched distortion value that correspond to the forward prediction block, determine that the forward prediction block, the second prediction block, the third prediction block, the fourth prediction block, the fifth prediction block, or the sixth prediction block that each corresponds to the first smallest matched distortion value is the target prediction block, when the first prediction block is the backward prediction block, determine a second smallest matched distortion value among the first matched distortion value, the second matched distortion value, the third matched distortion value, the fourth matched distortion value, the fifth matched distortion value, and the sixth matched distortion value that correspond to the backward prediction block, and determine that the backward prediction block, the second prediction block, the third prediction block, the fourth prediction block, the fifth prediction block, or the sixth prediction block that each corresponds to the second smallest matched distortion value is the target prediction block.

In a possible implementation, the second prediction block, the third prediction block, the fourth prediction block, the fifth prediction block, and the sixth prediction block are respectively prediction block obtained by shifting the first prediction block upward, downward, leftward, rightward, and in the diagonal direction in the reference frame based on first sample accuracy.

The calculation module is further configured to, when the second matched distortion value, the third matched distortion value, the fourth matched distortion value, the fifth matched distortion value, and the sixth matched distortion value are all greater than or equal to the first matched distortion value, calculate a seventh matched distortion value between a seventh prediction block and the combined prediction block, an eighth matched distortion value between an eighth prediction block and the combined prediction block, a ninth matched distortion value between a ninth prediction block and the combined prediction block, a tenth matched distortion value between a tenth prediction block and the combined prediction block, and an eleventh matched distortion value between an eleventh prediction block and the combined prediction block, where the seventh prediction block, the eighth prediction block, the ninth prediction block, the tenth prediction block, and the eleventh prediction block are respectively prediction block obtained by shifting the first prediction block upward, downward, leftward, rightward, and in the diagonal direction in the reference frame based on second sample accuracy.

The first determining module is specifically configured to, when the first prediction block is the forward prediction block, determine a first smallest matched distortion value among the first matched distortion value, the seventh matched distortion value, the eighth matched distortion value, the ninth matched distortion value, the tenth matched distortion value, and the eleventh matched distortion value, determine that the forward prediction block, the seventh prediction block, the eighth prediction block, the ninth prediction block, the tenth prediction block, or the eleventh prediction block that each corresponds to the first smallest matched distortion value is the target prediction block, when the first prediction block is the backward prediction block, determine a second smallest matched distortion value among the first matched distortion value, the seventh matched distortion value, the eighth matched distortion value, the ninth matched distortion value, the tenth matched distortion value, and the eleventh matched distortion value, and determine that the backward prediction block, the seventh prediction block, the eighth prediction block, the ninth prediction block, the tenth prediction block, or the eleventh prediction block that each corresponds to the second smallest matched distortion value is the target prediction block.

In a possible implementation, the first sample accuracy is integer sample accuracy, and the second sample accuracy is half-sample accuracy.

In a possible implementation, P0[n] is a sample value of a sample in the sampled first prediction block, second prediction block, third prediction block, fourth prediction block, fifth prediction block, or sixth prediction block, P1[n]

is a sample value of a sample in the sampled combined prediction block, corresponding positions of P0[n] and P1[n] in the two sampled prediction blocks are the same, and L is a quantity of samples in a sampled prediction block.

According to a ninth aspect, an embodiment of this application provides a video coding device, including a non-volatile memory and a processor that are coupled to each other, where the processor invokes program code stored in the memory, to perform the method described in any one of the first aspect and the possible implementations of the first aspect.

According to a tenth aspect, an embodiment of this application provides a video coding device, including a non-volatile memory and a processor that are coupled to each other, where the processor invokes program code stored in the memory, to perform the method described in any one of the second aspect and the possible implementations of the second aspect.

According to an eleventh aspect, an embodiment of this application provides a video coding device, including a non-volatile memory and a processor that are coupled to each other, where the processor invokes program code stored in the memory, to perform the method described in any one of the third aspect and the possible implementations of the third aspect.

According to a twelfth aspect, an embodiment of this application provides a video coding device, including a non-volatile memory and a processor that are coupled to each other, where the processor invokes program code stored in the memory, to perform the method described in any one of the fourth aspect and the possible implementations of the fourth aspect.

According to a thirteenth aspect, an embodiment of this application provides a computer-readable storage medium. The computer-readable storage medium stores program code, and the program code includes instructions used to perform some or all of the steps in the method described in any one of the first aspect and the possible implementations of the first aspect.

According to a fourteenth aspect, an embodiment of this application provides a computer-readable storage medium. The computer-readable storage medium stores program code, and the program code includes instructions used to perform some or all of the steps in the method described in any one of the second aspect and the possible implementations of the second aspect.

According to a fifteenth aspect, an embodiment of this application provides a computer-readable storage medium. The computer readable storage medium stores program code, and the program code includes instructions used to perform some or all of the steps in the method described in any one of the third aspect and the possible implementations of the third aspect.

According to a sixteenth aspect, an embodiment of this application provides a computer-readable storage medium. The computer-readable storage medium stores program code, and the program code includes instructions used to perform some or all of the steps in the method described in any one of the fourth aspect and the possible implementations of the fourth aspect.

According to a seventeenth aspect, an embodiment of this application provides a computer program product. When the computer program product runs on a computer, the computer is enabled to perform some or all of the steps in the method described in any one of the first aspect and the possible implementations of the first aspect.

According to an eighteenth aspect, an embodiment of this application provides a computer program product. When the computer program product runs on a computer, the computer is enabled to perform some or all of the steps in the method described in any one of the second aspect and the possible implementations of the second aspect.

According to a nineteenth aspect, an embodiment of this application provides a computer program product. When the computer program product runs on a computer, the computer is enabled to perform some or all of the steps in the method described in any one of the third aspect and the possible implementations of the third aspect.

According to a twentieth aspect, an embodiment of this application provides a computer program product. When the computer program product runs on a computer, the computer is enabled to perform some or all of the steps in the method described in any one of the fourth aspect and the possible implementations of the fourth aspect.

It should be understood that technical solutions of the fifth to the twentieth aspects of this application are consistent with technical solutions of the first to the fourth aspects of this application, and advantageous effects achieved by the aspects and the corresponding feasible implementations are similar. Details are not described again.

The motion vector determining method provided in this application include calculating only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, where the first prediction block, the second prediction block, the third prediction block, and the fourth prediction block are respectively prediction blocks obtained by shifting a forward prediction block upward, downward, leftward, and rightward, the fifth prediction block, the sixth prediction block, the seventh prediction block, and the eighth prediction block are respectively prediction blocks obtained by shifting a backward prediction block downward, upward, rightward, and leftward in a backward reference frame, determining a target forward prediction block and a target backward prediction block based on a value relationship between the matched distortion values, and determining a target motion vector of a current block based on the target forward prediction block and the target backward prediction block. Only the matched distortion values between the prediction blocks obtained by shifting the forward prediction block and the backward prediction block in the four directions (upward, downward, leftward, and rightward) need to be calculated, thereby reducing a calculation amount of the matched distortion values, and improving motion vector calculation efficiency.

DESCRIPTION OF EMBODIMENTS

The following describes the embodiments of this application with reference to accompanying drawings in the embodiments of this application. In the following description, reference is made to the accompanying drawings that form a part of this disclosure and show, through illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that a disclosure with reference to a described method may also hold true for a corresponding device or system configured to perform the method and vice versa. For example, if one or more specific method steps are described, a corresponding device may include one or more units such as functional units, to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as functional units, a corresponding method may include one step, to implement functionality of the one or more units (for example, one step used to implement the functionality of the one or more units, or a plurality of steps each used to implement functionality of one or more of a plurality of units), even if such one or more steps are not explicitly described or illustrated in the accompanying drawings. Further, it should be understood that features of the example embodiments and/or aspects described in this specification may be combined with each other, unless specifically noted otherwise.

The technical solutions in the embodiments of this application may not only be applied to existing video coding standards (for example, standards such as H.264 and High Efficiency Video Coding (HEVC)), but also be applied to future video coding standards (for example, the H.266 standard). Terms used in embodiments of this application are only used to explain specific embodiments of this application, but are not intended to limit this application.

Figure 1:
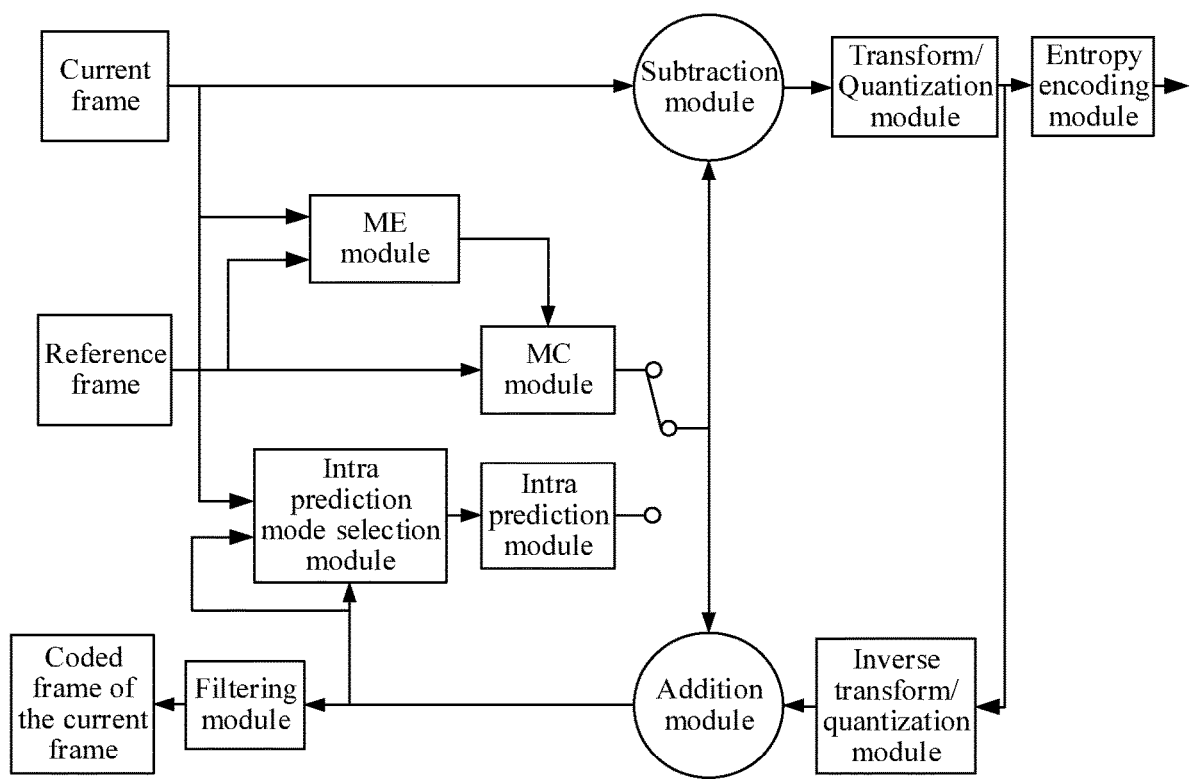
FIG. 1 is a schematic diagram of a video encoding apparatus.

This application provides a motion vector determining method. The method may be applied to a video encoding apparatus or a video decoding apparatus. FIG. 1 is a schematic diagram of a video encoding apparatus. As shown in FIG. 1, the video encoding apparatus includes a motion estimation (ME) module, a motion compensation (MC) module, a subtraction module, a transform module/quantization module, an entropy encoding module, an intra prediction mode selection module, an intra prediction module, an inverse transform module/inverse quantization module, an addition module, and a filtering module.

The video encoding apparatus attempts to perform intra prediction and inter prediction on a current frame (which is also referred to as a current picture), and finally determines, based on a prediction result, whether to use intra prediction or inter prediction. Intra prediction means predicting a sample value of a sample in a to-be-encoded current block by using a sample value of a sample in a reconstructed region in the current frame. Inter prediction means searching a reconstructed reference frame for a matched target prediction block (which is also referred to as a reference block) of the current block in the current frame, and predicting a predicted sample value of a sample in the current block based on a sample value of a sample in the target prediction block.

Inter prediction is classified into unidirectional inter prediction and bi-directional inter prediction. Unidirectional inter prediction includes forward inter prediction and backward inter prediction. Forward inter prediction means selecting a reference frame for a current block from a forward reference frame set to determine a target prediction block. Backward inter prediction means selecting a reference frame for the current block from a backward reference frame set to determine a target prediction block. Bi-directional inter prediction means separately selecting a reference frame from each of a forward reference frame set and a backward reference frame set to determine a target prediction block. When bi-directional inter prediction is performed, there are two target prediction blocks for the current block a target forward prediction block and a target backward prediction block. The target forward prediction block is determined from a forward reference frame, and the target backward prediction block is determined from a backward reference frame. When prediction is performed, a predicted sample value of a sample in the current block is determined based on sample values of samples in the two target prediction blocks.

The forward reference frame is a frame that is encoded and played before a frame in which the current block is located. The backward reference frame is a frame that is encoded before the frame in which the current block is located and that is played after the frame in which the current block is located. The forward reference frame set is also referred to as a forward reference frame list, and the backward reference frame set is also referred to as a backward reference frame list. The forward reference frame set and the backward reference frame set each may include one or more reference frames. Quantities of reference frames included in the forward reference frame set and the backward reference frame set may be the same, or may be different.

Before encoding is performed, a to-be-encoded current frame needs to be divided into blocks. The current frame is divided into one or more coding blocks. The coding block is an M×N array, where M and N are quantities of samples in a height direction and a width direction of the coding block, values of M and N may be the same or may be different, and sample values of samples in the coding block are known.

In an inter prediction process, the ME module performs search in the reference frame based on the current block and the reference frame, to obtain the target prediction block (including the target forward prediction block and/or the target backward prediction block) of the current block, and obtains a motion vector based on the coding block and the target prediction block.

The motion vector may be represented by a quantity ($\Delta x$, $\Delta y$), where $\Delta x$ represents a horizontal displacement of the target prediction block relative to a position of the current block, and $\Delta y$ represents a vertical displacement of the target prediction block relative to the position of the current block.

The MC module performs MC on the current block based on the motion vector, to obtain the predicted sample value of the sample in the current block. For example, the MC module determines the target prediction block of the current block based on the motion vector and the reference frame, and obtains the predicted sample value of the sample in the current block based on the target prediction block of the current block.

The subtraction module subtracts a predicted sample value of the current block from an actual sample value of the current block to obtain residual information of the current block. Then, the transform module transforms the residual information, or the quantization module quantizes the residual information. The transform module may transform the residual information by using a method, for example, discrete cosine transformation (DCT).

The entropy encoding module performs entropy encoding on quantized or transformed residual information, and sends motion information of the current block and entropy encoded residual information to a receive end.

The motion information of the current block includes the motion vector and the reference frame. The motion information is also referred to as motion data, and an index of the reference frame may be represented by $\Delta t$. The motion information of the current block obtained by using a bi-directional inter prediction block includes motion information ($\Delta x_0$, $\Delta y_0$, $\Delta t_0$) of the forward prediction block and motion information ($\Delta x_1$, $\Delta y_1$, $\Delta t_1$) of the backward prediction block.

The inverse quantization module performs inverse quantization on the quantized residual information, or the inverse transform module performs inverse transform on the transformed residual information, to obtain restored residual information. The addition module adds the restored residual information and the predicted sample value of the current block, to obtain a restored current block. The filtering module filters the restored current block, and performs the foregoing process on the coding block obtained through division, to obtain a coded frame of the current frame. The coded frame of the current frame may be used for encoding a subsequent frame.

In an intra prediction process, the intra prediction mode selection module selects one intra prediction mode from a plurality of intra prediction modes, and the intra prediction block performs intra prediction in the intra prediction mode selected by the intra prediction mode selection module, to obtain the predicted sample value of the sample in the current block. The subtraction module subtracts a predicted sample value of the current block from an actual sample value of the current block to obtain residual information of the current block. Then, the transform module transforms the residual information, or the quantization module quantizes the residual information, and the transform module may transform the residual information by using a method, for example, DCT. The entropy encoding module performs entropy encoding on quantized or transformed residual information, and sends motion information of the current block and entropy encoded residual information to a receive end. The inverse quantization module performs inverse quantization on the quantized residual information, or the inverse transform module performs inverse transform on the transformed residual information, to obtain restored residual information. The addition module adds the restored residual information and the predicted sample value of the current block, to obtain a restored current block. The filtering module filters the restored current block. In addition, the addition module sends the restored current block to the intra prediction mode selection module and an intra prediction module for encoding a subsequent frame.

The motion information of the current block may include prediction mode indication information, one or two motion vectors pointing to a prediction block, and a reference index. The prediction mode indication information is used to indicate which one of forward inter prediction, backward inter prediction, or bi-directional inter prediction is performed on the current block. The reference index is used to indicate a reference frame used by the current block. The motion vector is used to indicate a position offset, relative to the current block in the current frame, of the target prediction block used to predict the current block in the reference frame. Therefore, one motion vector corresponds to one prediction block.

Figure 2:
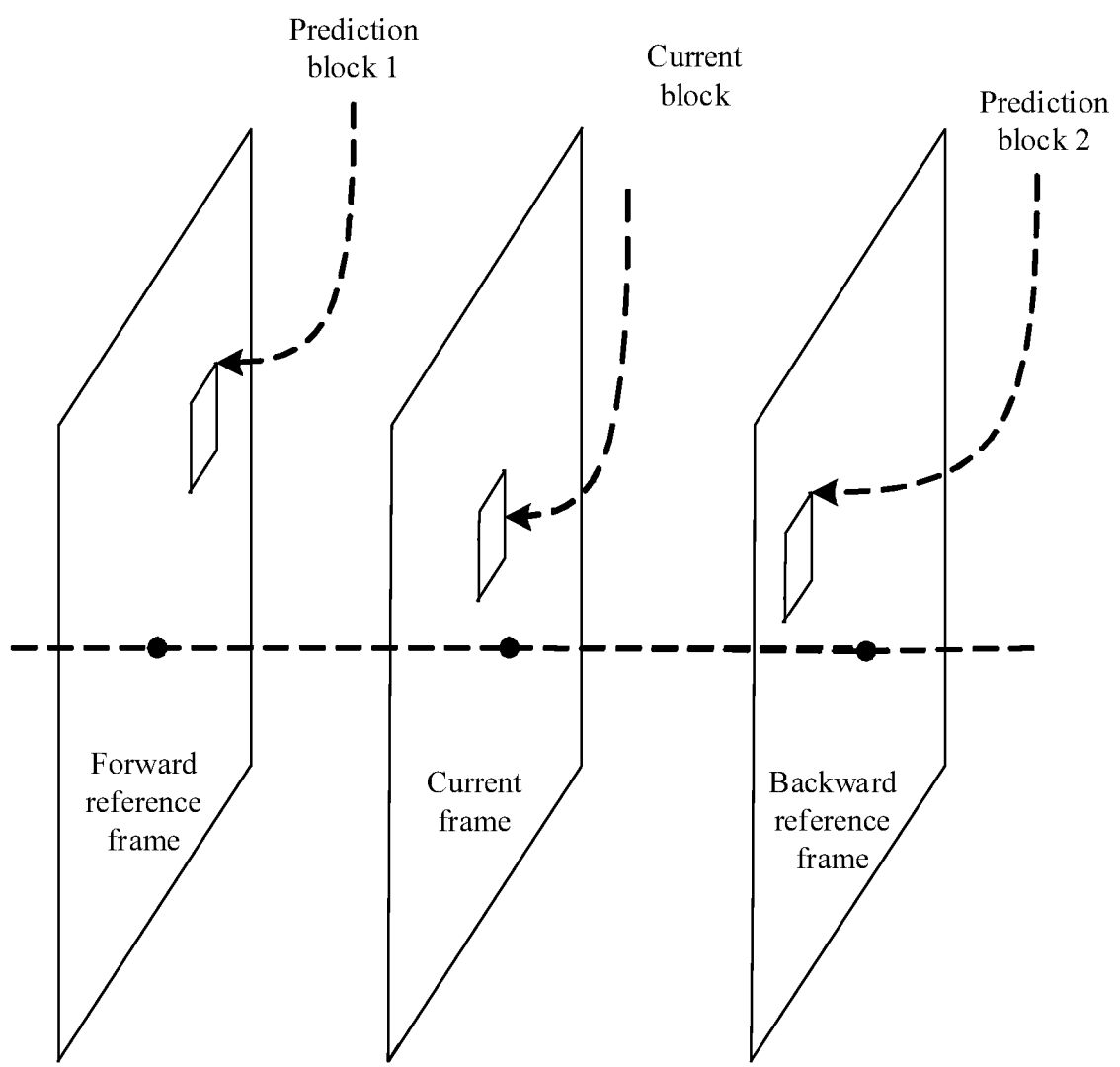
FIG. 2 is a schematic diagram of inter prediction.

The method in this application is mainly applied to inter prediction, and is mainly performed on an encoder side by the ME module in the video encoding apparatus shown in FIG. 1. FIG. 2 is a schematic diagram of inter prediction. As shown in FIG. 2, bi-directional inter prediction is performed on a current frame. A reference frame of the current frame includes a forward reference frame and a backward reference frame, and an ME module performs search on the forward reference frame and the backward reference frame, to obtain target prediction blocks of the current block a prediction block 1 in the forward reference frame and a prediction block 2 in the backward reference frame.

Figure 3:
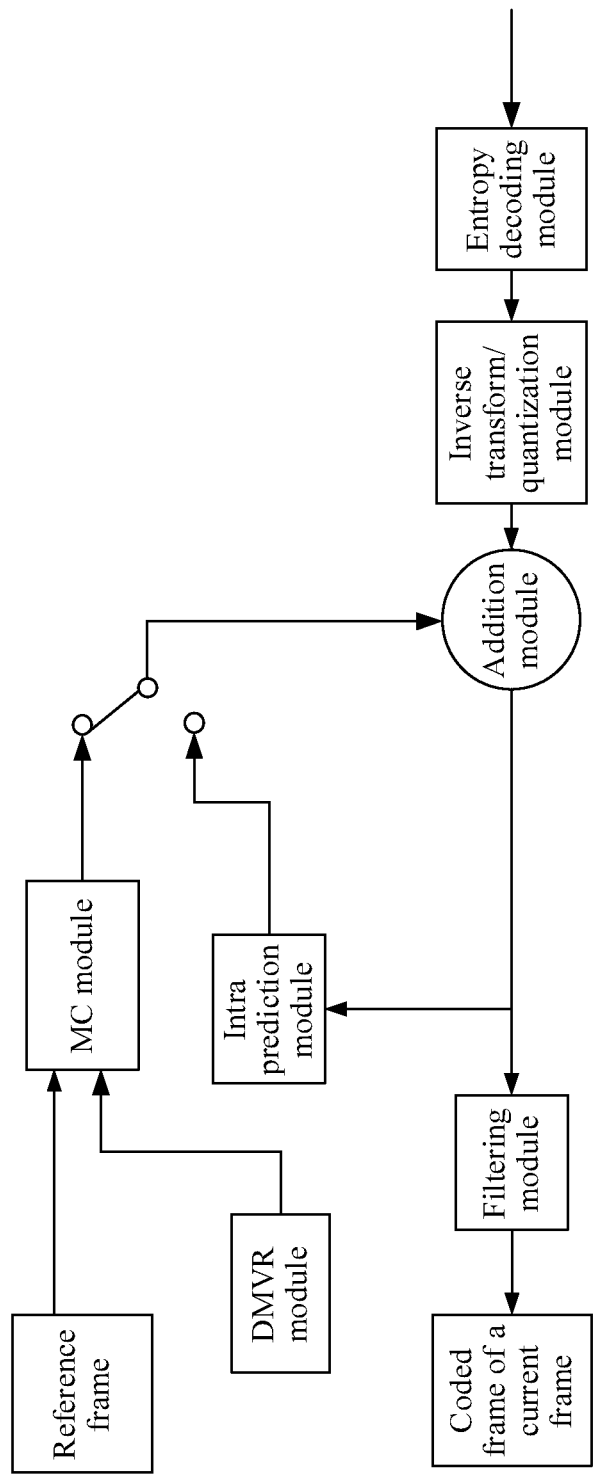
FIG. 3 is a schematic diagram of a video decoding apparatus.

A decoding process is an inverse process of an encoding process. FIG. 3 is a schematic diagram of a video decoding apparatus. As shown in FIG. 3, the video decoding apparatus includes an entropy decoding module, an inverse transform module/inverse quantization module, an addition module, an intra prediction module, an MC module, a filtering module, and a DMVR module.

The entropy decoding module decodes received and entropy encoded residual information that is sent by an encoder side. The inverse quantization module performs inverse quantization on the decoded residual information, or the inverse transform module performs inverse transform on the decoded residual information, to obtain residual information of a current block. The DMVR module determines a reference frame and a prediction mode of the current block based on decoded motion information of the current block, determines a target prediction block of the current block based on the reference frame and a prediction mode, and determines a motion vector based on the target prediction block of the current block. The MC module determines the target prediction block of the current block based on the reference frame and the motion vector that is determined by the DMVR module, and determines a predicted sample value of a sample in the current block based on the target prediction block of the current block. The addition module adds a predicted sample value of the current block and the residual information of the current block to obtain a restored current block. The filter filters the restored current block to obtain a reconstructed current block. The addition module also sends the restored current block to the intra prediction module.

Figure 4:
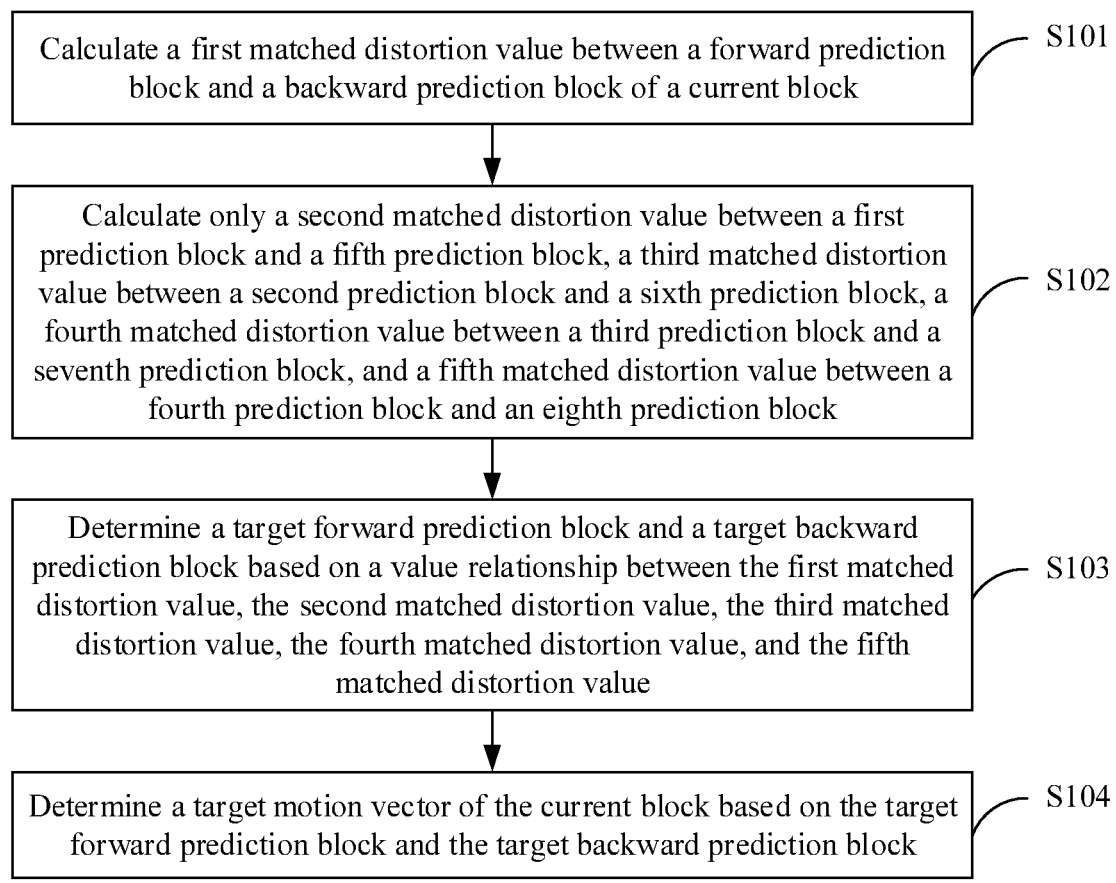
FIG. 4 is a flowchart of a motion vector determining method according to Embodiment 1 of this application.

FIG. 4 is a flowchart of a motion vector determining method according to Embodiment 1 of this application. The method in this embodiment is applied to a bi-directional inter prediction process, and may be applied to an encoder side and a decoder side. When applied to the encoder side, the method may be performed by the ME module in the video encoding apparatus shown in FIG. 1. When applied to the decoder side, the method may be performed by the DMVR module in the video decoding apparatus shown in FIG. 3. As shown in FIG. 4, the method provided in this embodiment includes the following steps.

Step S101. Calculate a first matched distortion value between a forward prediction block and a backward prediction block of a current block.

The method in this embodiment is applied to bi-directional inter prediction. There are two prediction blocks for the current block the forward prediction block and the backward prediction block. The forward prediction block refers to a picture block in a corresponding region of a reference frame, in a reference frame list 0 (List 1), whose picture order count (POC) is less than (or greater than) a POC of the current frame based on a size and predicted motion information of the current block. The backward prediction block refers to a picture block in a corresponding region of a reference frame, in a reference frame list 1 (List 0), whose POC is greater than (or less than) the POC of the current frame based on the size and the predicted motion information of the current block.

Figure 5:
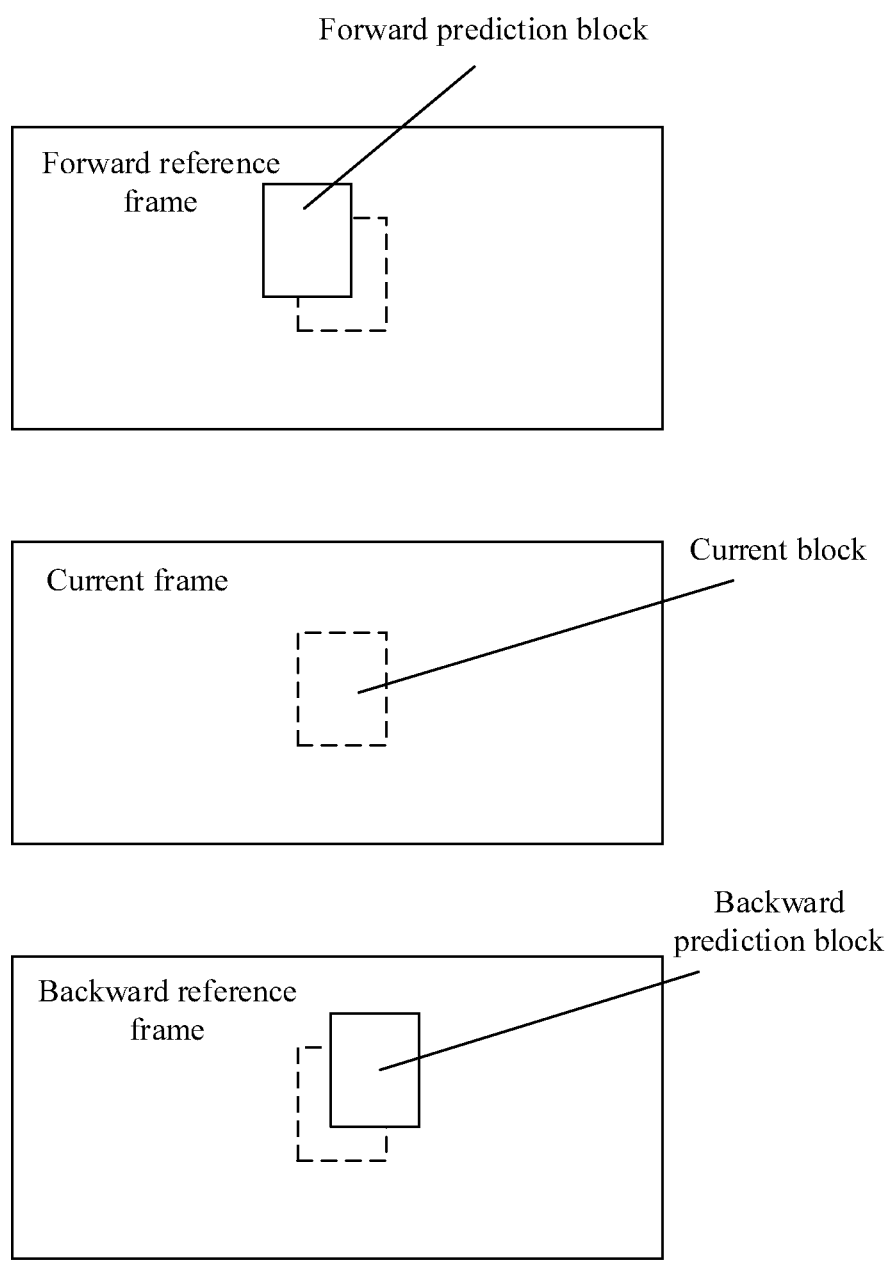
FIG. 5 is a schematic diagram of a current block, a forward prediction block, and a backward prediction block.

FIG. 5 is a schematic diagram of the current block, the forward prediction block, and the backward prediction block. As shown in FIG. 5, there are two types of prediction motion information for the current block forward prediction motion information and backward prediction motion information. The forward prediction motion information and the backward prediction motion information are separately obtained. The forward prediction motion information includes an index $\Delta t_0$ and an MV 0 ($\Delta x_0$, $\Delta y_0$) of a forward reference frame. The forward reference frame belongs to the reference frame list 0. The backward prediction motion information includes an index $\Delta t_1$ and an MV 1 ($\Delta x_1$, $\Delta y_1$) of a backward reference frame. The backward reference frame belongs to the reference frame list 1.

Position information and the size of the current block in the current frame are known, and sizes of the forward prediction block and the backward prediction block are the same as the size of the current block. Therefore, the forward reference frame is found from the reference frame list 0 based on the index $\Delta t_0$ of the forward reference frame, and the forward prediction block is obtained based on a position of the current block in the current frame and the MV 0 ($\Delta x_0$, $\Delta y_0$). As shown in FIG. 5, a dashed-line box in the forward reference frame indicates a corresponding position of the current block in the forward reference frame, and the corresponding position of the current block in the forward reference frame shifts based on the MV 0 ($\Delta x_0$, $\Delta y_0$) to obtain the forward prediction block.

Likewise, the backward reference frame is found from the reference frame list 1 based on the index $\Delta t_1$ of the backward reference frame, and the backward prediction block is obtained based on the position of the current block in the current frame and the MV 1 ($\Delta x_1$, $\Delta y_1$). As shown in FIG. 5, a dashed-line box in the backward reference frame indicates a corresponding position of the current block in the backward reference frame, and the corresponding position of the current block in the backward reference frame shifts based on the MV 1 ($\Delta x_1$, $\Delta y_1$) to obtain the backward prediction block.

Step S102. Calculate only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block.

The first prediction block, the second prediction block, the third prediction block, and the fourth prediction block are respectively prediction blocks obtained by shifting the forward prediction block upward, downward, leftward, and rightward in a forward reference frame. The fifth prediction block, the sixth prediction block, the seventh prediction block, and the eighth prediction block are respectively prediction blocks obtained by shifting the backward prediction block downward, upward, rightward, and leftward in a backward reference frame.

In this embodiment, only the forward prediction block and the backward prediction block shift in four directions (upward, downward, leftward, and rightward). During each shifting, shifting directions of the forward prediction block and the backward prediction block are opposite. During each shifting, the forward prediction block and the backward prediction block may shift by using same sample accuracy.

Figure 6:
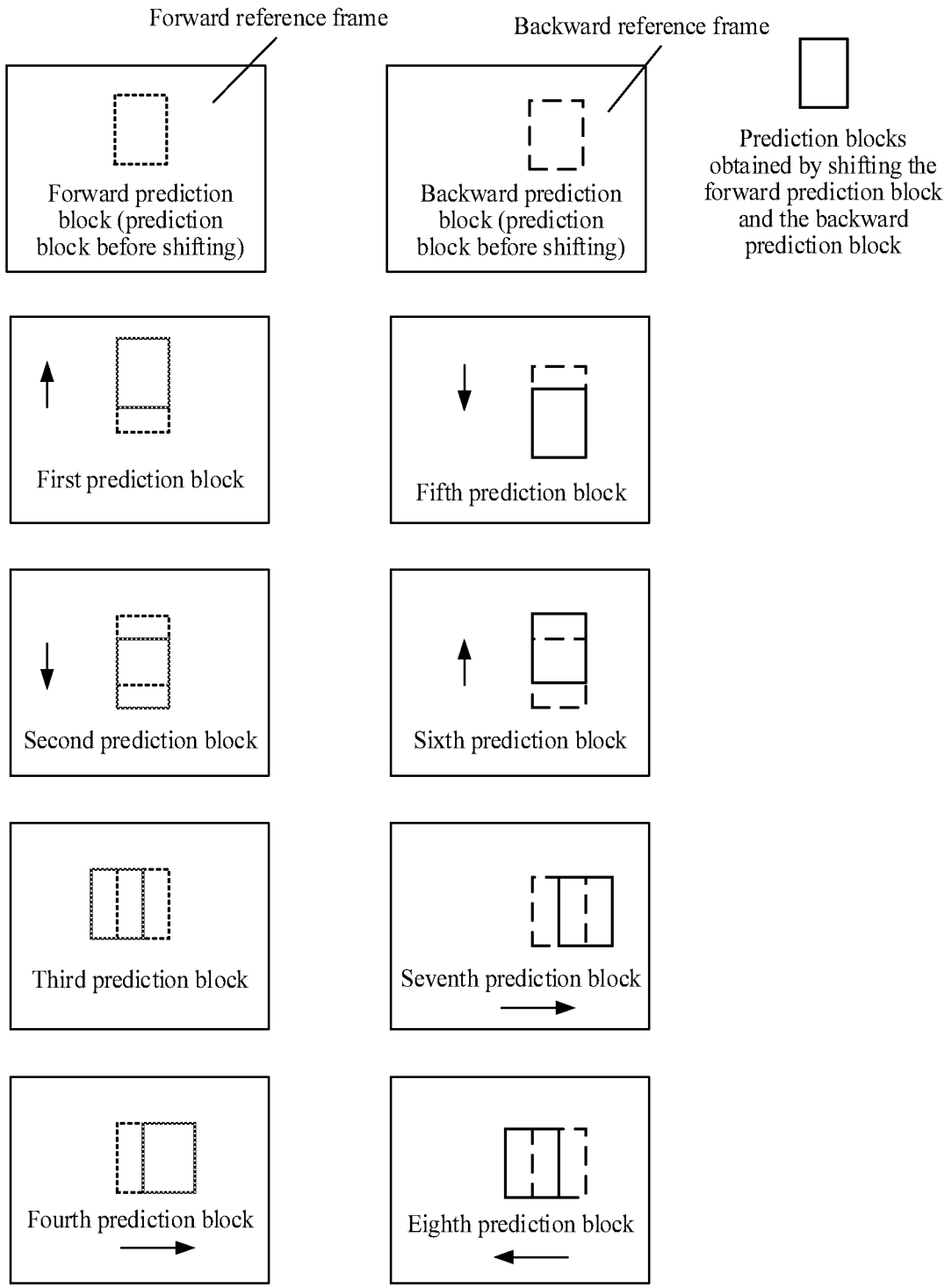
FIG. 6 is a schematic diagram of shifting of a forward prediction block and a backward prediction block.

FIG. 6 is a schematic diagram of shifting of the forward prediction block and the backward prediction block. As shown in FIG. 6, solid-line boxes represent prediction blocks obtained by shifting the forward prediction block and the backward prediction block, and arrows in the figure represent shifting directions of the forward prediction block and the backward prediction block.

In this embodiment, the forward prediction block and the backward prediction block may shift in the reference frames based on preset first sample accuracy to obtain other prediction blocks. The first sample accuracy may be integer sample accuracy, and the integer sample accuracy is an integer multiple of one sample accuracy. For example, the first sample accuracy is one sample, two samples, or three samples.

The first sample accuracy may alternatively be non-integer sample accuracy. The non-integer sample accuracy is a non-integer multiple of one sample accuracy. For example, the first sample accuracy is 0.5 sample, 1.25 samples, 1.5 samples, or 2.5 samples.

Regardless of whether the first sample accuracy is integer sample accuracy or non-integer sample accuracy, during each shifting, the forward prediction block or the backward prediction block shifts upward, downward, leftward, or rightward by one first sample accuracy.

Optionally, if a pixel obtained by shifting the forward prediction block or the backward prediction block is a non-integer sample, the pixel obtained through the shifting may be adjusted to integer sample accuracy, and a pixel may be compensated based on the non-integer sample obtained through the shifting. For example, if the first prediction block obtained by shifting the forward prediction block by the first sample accuracy is located at the 0.5 sample position, the 0.5 sample is compensated, so that the first prediction block is located in an integer sample position. More universally, for example, the first prediction block is located at an x1 sample position, x2 samples are compensated, where x1+x2=N0 integer samples, and N0 is a preset nonnegative value, for example, a preset positive integer, so that the first prediction block is located in an integer sample position.

In this embodiment, during each search, the forward prediction block and the backward prediction block shift by one first sample accuracy in each of four directions (upward, downward, leftward, and rightward), and a plurality of times of search may be performed until an optimal prediction block is found. During each search, one first sample accuracy is increased based on previous search. For example, during first search, the forward prediction block and the backward prediction block separately shift upward, downward, leftward, and rightward by one sample, during second search, the forward prediction block and the backward prediction block separately shift upward, downward, leftward, and rightward by two samples, and during third search, the forward prediction block and the backward prediction block separately shift upward, downward, leftward, and rightward by three samples.

In this embodiment, any one of the first matched distortion value, the second matched distortion value, the third matched distortion value, the fourth matched distortion value, and the fifth matched distortion value includes a SAD between the two prediction blocks. The SAD may be calculated in the following manners.

Manner 1. The SAD may be calculated in the following manner:

$$SAD=\Sigma_{n=0}^{n=L-1}[abs(P0[n]-P1[n]-K)],$$

where when P0[n] is a sample value of a sample in the forward prediction block, the first prediction block, the second prediction block, the third prediction block, or the fourth prediction block, P1[n] is correspondingly a sample value of a sample in the backward prediction block, the fifth prediction block, the sixth prediction block, the seventh prediction block, or the eighth prediction block, corresponding positions of P0[n] and P1[n] in the two prediction blocks are the same, L is a quantity of samples in a prediction block, and K is an average between the two prediction blocks.

To be specific, when P0[n] is the sample value of the sample in the forward prediction block, P1[n] is the sample value of the sample in the backward prediction block. When P0[n] is the sample value of the sample in the first prediction block, P1[n] is the sample value of the sample in the fifth prediction block. When P0[n] is the sample value of the sample in the second prediction block, P1[n] is the sample value of the sample in the sixth prediction block. When P0[n] is the sample value of the sample in the third prediction block, P1[n] is the sample value of the sample in the seventh prediction block. When P0[n] is the sample value of the sample in the fourth prediction block, P1[n] is the sample value of the sample in the eighth prediction block.

K may be calculated according to the following formula:

$$K=(\Sigma_{0\leq i M<, 0\leq j<N}P0[i][j]-\Sigma_{0\leq i M<, 0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, or fourth prediction block, P1[i][j] is correspondingly a sample value of a sample in the sampled backward prediction block, fifth prediction block, sixth prediction block, seventh prediction block, or eighth prediction block, and corresponding positions of P0[i][j] and P1[i][j] in the two prediction blocks are the same.

K is an integer, and "/" not only represents a division operation, but also represents a rounding operation. Rounding up or rounding down may be performed during rounding.

In this manner, when K is calculated, the prediction block is sampled, so that a calculation amount of K is reduced, and calculation complexity of matched distortion values is reduced. A sampling manner is not limited in this embodiment. An even-numbered sample or an odd-numbered sample may be removed, and K calculated through sampling is also referred to as a sub-average.

Manner 2. The SAD may be calculated in the following manner:

$$SAD=\Sigma_{n=0}^{n=L-1}[abs(P0[n]-P1[n])],$$

where when P0[n] is a sample value of a sample in the forward prediction block, the first prediction block, the second prediction block, the third prediction block, or the fourth prediction block, P1[n] is correspondingly a sample value of a sample in the backward prediction block, the fifth prediction block, the sixth prediction block, the seventh prediction block, or the eighth prediction block, corresponding positions of P0[n] and P1[n] in the two prediction blocks are the same, and L is a quantity of samples in a prediction block.

In this manner, when a matched distortion value is calculated, no average between two prediction blocks needs to be calculated, thereby simplifying calculation of the matched distortion value.

Optionally, in the foregoing two manners, P0[n] is the sample value of the sample in the sampled forward prediction block, first prediction block, second prediction block, third prediction block, or fourth prediction block, and P1[n] is correspondingly the sample value of the sample in the sampled backward prediction block, fifth prediction block, sixth prediction block, seventh prediction block, or eighth prediction block. Sampling reduces a calculation amount of the SAD and calculation complexity of the matched distortion values.

Manner 3. A difference from Manner 1 lies in that, in Manner 1, the prediction block is sampled when K is calculated, however, in Manner 3, no prediction block is sampled when K is calculated.

In this embodiment, during each search, only matched distortion values in four directions (upward, downward, leftward, and rightward) need to be calculated. However, in a conventional technology, during each search, matched distortion values in at least five directions (upward, downward, leftward, rightward, and diagonal) need to be calculated. In this way, a calculation amount of matched distortion values is reduced.

Step S103. Determine a target forward prediction block and a target backward prediction block based on a value relationship between the first matched distortion value, the second matched distortion value, the third matched distortion value, the fourth matched distortion value, and the fifth matched distortion value.

For example, the target forward prediction block and the target backward prediction block may be determined in the following manners.

(Manner 1) A smallest matched distortion value is determined among the first matched distortion value, the second matched distortion value, the third matched distortion value, the fourth matched distortion value, and the fifth matched distortion value. It is determined that the forward prediction block, the first prediction block, the second prediction block, the third prediction block, or the fourth prediction block that each corresponds to the smallest matched distortion value is the target forward prediction block. It is determined that the backward prediction block, the fifth prediction block, the sixth prediction block, the seventh prediction block, or the eighth prediction block that each corresponds to the smallest matched distortion value is the target backward prediction block.

There may be one or more smallest matched distortion values. When there are a plurality of smallest matched distortion values, a smallest matched distortion value may be randomly selected to determine the target forward prediction block and the target backward prediction block. Alternatively, a smallest matched distortion value may be selected according to a preset rule to determine the target forward prediction block and the target backward prediction block.

When the smallest matched distortion value is the first matched distortion value, in other words, the second matched distortion value, the third matched distortion value, the fourth matched distortion value, and the fifth matched distortion value are all greater than or equal to the first matched distortion value, the forward prediction block is the target forward prediction block, and the backward prediction block is the target backward prediction block.

(Manner 2) When the second matched distortion value, the third matched distortion value, the fourth matched distortion value, and the fifth matched distortion value are all greater than or equal to the first matched distortion value, calculate only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block. The ninth prediction block, the tenth prediction block, the eleventh prediction block, and the twelfth prediction block are respectively prediction blocks obtained by shifting the forward prediction block upward, downward, leftward, and rightward in the forward reference frame based on second sample accuracy. The thirteenth prediction block, the fourteenth prediction block, the fifteenth prediction block, and the sixteenth prediction block are respectively prediction blocks obtained by shifting the backward prediction block downward, upward, rightward, and leftward in the backward reference frame based on the second sample accuracy.

A smallest matched distortion value is determined among the first matched distortion value, the sixth matched distortion value, the seventh matched distortion value, the eighth matched distortion value, and the ninth matched distortion value. It is determined that the forward prediction block, the ninth prediction block, the tenth prediction block, the eleventh prediction block, or the twelfth prediction block that each corresponds to the smallest matched distortion value is the target forward prediction block. It is determined that the backward prediction block, the thirteenth prediction block, the fourteenth prediction block, the fifteenth prediction block, or the sixteenth prediction block that each corresponds to the smallest matched distortion value is the target backward prediction block.

For a calculation manner of the sixth matched distortion value, the seventh matched distortion value, the eighth matched distortion value, and the ninth matched distortion value, refer to a calculation manner of the first matched distortion value, the second matched distortion value, the third matched distortion value, the fourth matched distortion value, and the fifth matched distortion value in step S102. Details are not described herein again.

The second sample accuracy is different from the first sample accuracy, and the second sample accuracy may be greater than or less than the first sample accuracy. The second sample accuracy may also be integer sample accuracy or non-integer sample accuracy. For example, the first sample accuracy is integer sample accuracy while the second sample accuracy is non-integer sample accuracy. For example, the first sample accuracy is one sample while the second sample accuracy is ½ sample, ¼ sample, or ⅛ sample.

When the second matched distortion value, the third matched distortion value, the fourth matched distortion value, and the fifth matched distortion value are all greater than or equal to the first matched distortion value, more refined second sample accuracy is used for search, so that the determined target forward prediction block and the determined target backward prediction block are more accurate.

It should be noted that, if any one of the second matched distortion value, the third matched distortion value, the fourth matched distortion value, and the fifth matched distortion value is less than the first matched distortion value, the target forward prediction block and the target backward prediction block may be determined in Manner 1.

Step S104. Determine a target motion vector of the current block based on the target forward prediction block and the target backward prediction block.

In the bi-directional inter prediction mode, the target motion vector of the current block includes two vectors a first motion vector and a second motion vector. The first motion vector is a position offset of the target forward prediction block relative to the current block, and the second motion vector is a position offset of the target backward prediction block relative to the current block.

In this embodiment, during each search, only matched distortion values between prediction blocks obtained by shifting the forward prediction block and the backward prediction block in the four directions (upward, downward, leftward, and rightward) need to be calculated. However, in a conventional technology, at least matched distortion values between prediction blocks obtained by shifting the forward prediction block and the backward prediction block in a total of five directions (upward, downward, leftward, rightward, and diagonal) need to be calculated during each search. In this way, a calculation amount of matched distortion values is reduced, and motion vector calculation efficiency is improved.

Figure 7:
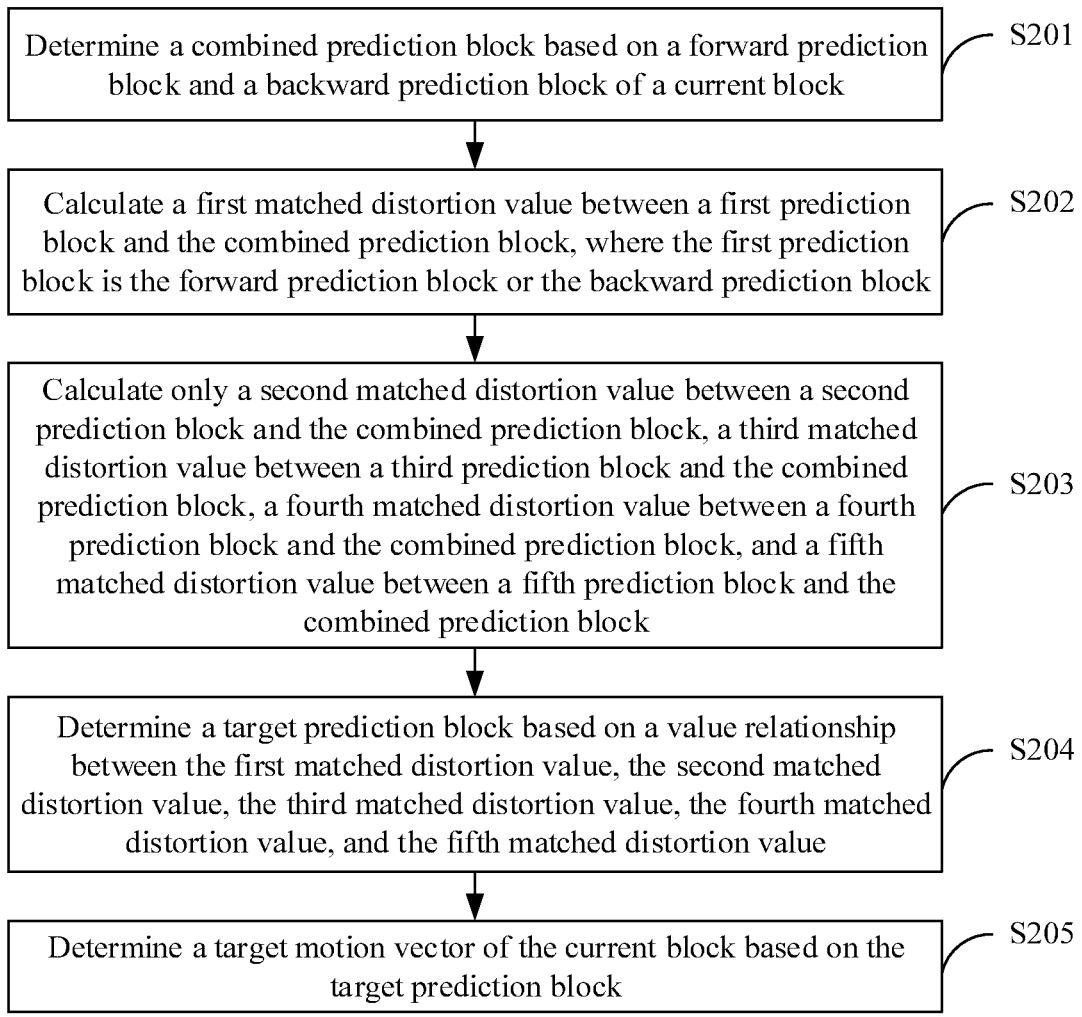
FIG. 7 is a flowchart of a motion vector determining method according to Embodiment 2 of this application.

FIG. 7 is a flowchart of a motion vector determining method according to Embodiment 2 of this application. The method in this embodiment is applied to a bi-directional inter prediction process, and may be applied to an encoder side and a decoder side. When applied to the encoder side, the method may be performed by the ME module in the video encoding apparatus shown in FIG. 1. When applied to the decoder side, the method may be performed by the DMVR module in the video decoding apparatus shown in FIG. 3. For some same concepts, refer to related descriptions in Embodiment 1. Details are not described again in this embodiment. As shown in FIG. 7, the method provided in this embodiment includes the following steps.

Step S201. Determine a combined prediction block based on a forward prediction block and a backward prediction block of a current block.

For example, sample values of samples in the forward prediction block and the backward prediction block are added and averaged, to obtain a sample value of a sample in the combined prediction block.

Step S202. Calculate a first matched distortion value between a first prediction block and the combined prediction block, where the first prediction block is the forward prediction block or the backward prediction block.

Step S203. Calculate only a second matched distortion value between a second prediction block and the combined prediction block, a third matched distortion value between a third prediction block and the combined prediction block, a fourth matched distortion value between a fourth prediction block and the combined prediction block, and a fifth matched distortion value between a fifth prediction block and the combined prediction block.

The second prediction block, the third prediction block, the fourth prediction block, and the fifth prediction block are respectively prediction blocks obtained by shifting the first prediction block upward, downward, leftward, and rightward in a reference frame. When the first prediction block is the forward prediction block, the reference frame is a forward reference frame. When the first prediction block is the backward prediction block, the reference frame is a backward reference frame.

Different from Embodiment 1, in this embodiment, only the first prediction block shifts, and no combined prediction block shifts.

Figure 8:
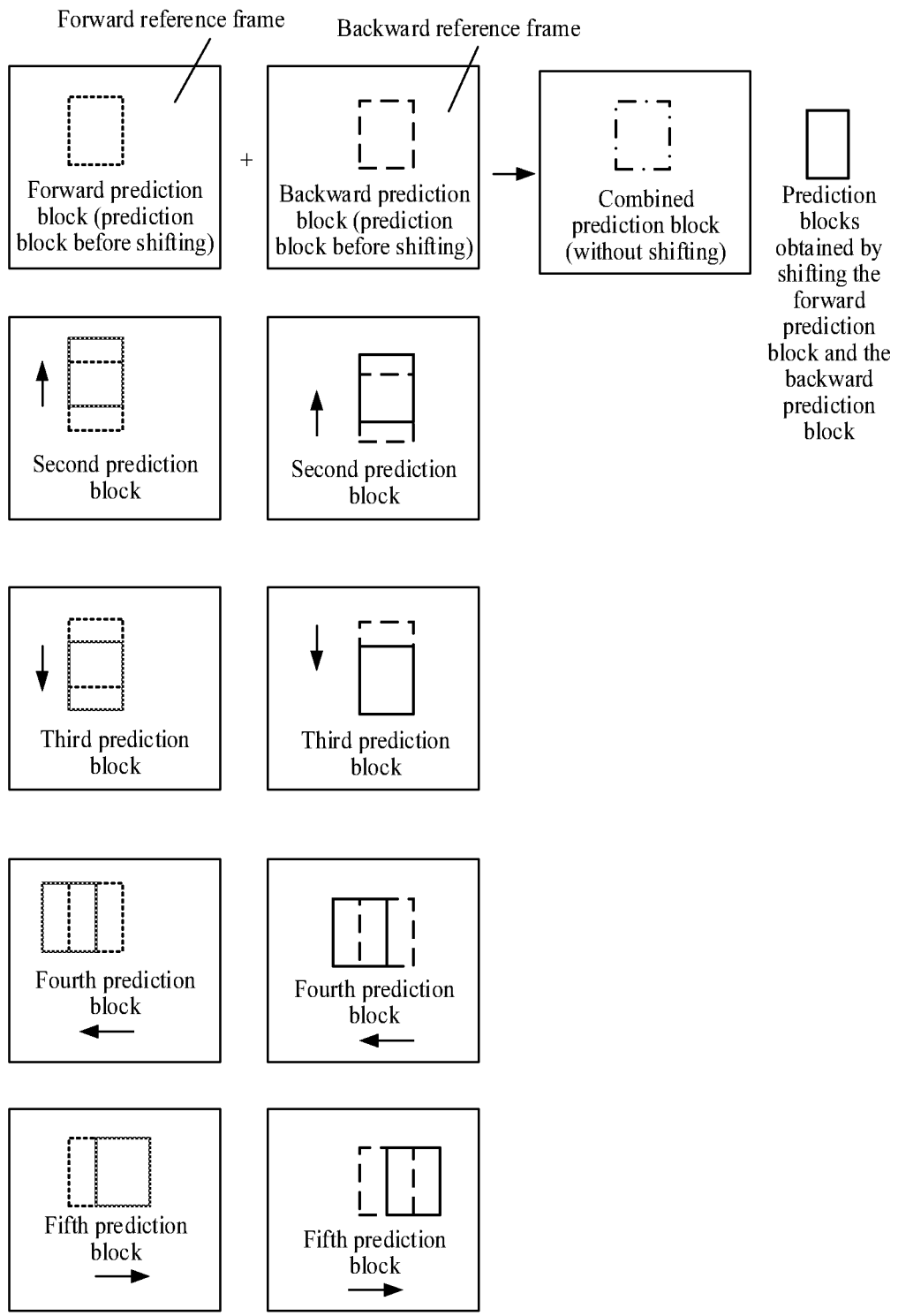
FIG. 8 is another schematic diagram of shifting of a forward prediction block and a backward prediction block.

FIG. 8 is another schematic diagram of shifting of the forward prediction block and the backward prediction block. As shown in FIG. 8, solid-line boxes represent prediction blocks obtained by shifting the forward prediction block and the backward prediction block, and arrows in the figure represents shifting directions of the forward prediction block and the backward prediction block. No combined prediction block needs to shift.

It should be noted that, in this embodiment, only the forward prediction block may shift in four directions (upward, downward, leftward, and rightward), however, the backward prediction block still shifts in at least five directions based on a conventional technology. Alternatively, only the backward prediction block shifts in four directions (upward, downward, leftward, and rightward), however, the forward prediction block still shifts in at least five directions based on a conventional technology. Alternatively, both the forward prediction block and the backward prediction block shift in four directions.

Step S204. Determine a target prediction block based on a value relationship between the first matched distortion value, the second matched distortion value, the third matched distortion value, the fourth matched distortion value, and the fifth matched distortion value.

For example, in this embodiment, the target prediction block may be determined in the following several manners.

(Manner 1) When the first prediction block is the forward prediction block, a first smallest matched distortion value is determined among the first matched distortion value, the second matched distortion value, the third matched distortion value, the fourth matched distortion value, and the fifth matched distortion value that correspond to the forward prediction block. It is determined that the forward prediction block, the second prediction block, the third prediction block, the fourth prediction block, or the fifth prediction block that each corresponds to the first smallest matched distortion value is the target prediction block.

When the first prediction block is the backward prediction block, a second smallest matched distortion value is determined among the first matched distortion value, the second matched distortion value, the third matched distortion value, the fourth matched distortion value, and the fifth matched distortion value that correspond to the backward prediction block. It is determined that the backward prediction block, the second prediction block, the third prediction block, the fourth prediction block, or the fifth prediction block that each corresponds to the second smallest matched distortion value is the target prediction block.

When the first smallest matched distortion value is the first matched distortion value, in other words, the second matched distortion value, the third matched distortion value, the fourth matched distortion value, and the fifth matched distortion value that correspond to the forward prediction block are all greater than or equal to the first matched distortion value, the target prediction block is the forward prediction block. When the second smallest matched distortion value is the first matched distortion value, in other words, the second matched distortion value, the third matched distortion value, the fourth matched distortion value, and the fifth matched distortion value that correspond to the backward prediction block are all greater than or equal to the first matched distortion value, the target prediction block is the backward prediction block.

(Manner 2) When the second matched distortion value, the third matched distortion value, the fourth matched distortion value, and the fifth matched distortion value are all greater than or equal to the first matched distortion value, only a sixth matched distortion value between a sixth prediction block and the combined prediction block, a seventh matched distortion value between a seventh prediction block and the combined prediction block, an eighth matched distortion value between an eighth prediction block and the combined prediction block, and a ninth matched distortion value between a ninth prediction block and the combined prediction block are calculated.

The sixth prediction block, the seventh prediction block, the eighth prediction block, and the ninth prediction block are respectively prediction blocks obtained by shifting the first prediction block upward, downward, leftward, and rightward in a reference frame based on second sample accuracy. The second prediction block, the third prediction block, the fourth prediction block, and the fifth prediction block are prediction blocks obtained by shifting the first prediction block upward, downward, leftward, and rightward in the reference frame based on first sample accuracy.

When the first prediction block is the forward prediction block, a first smallest matched distortion value is determined among the first matched distortion value, the sixth matched distortion value, the seventh matched distortion value, the eighth matched distortion value, and the ninth matched distortion value. It is determined that the forward prediction block, the sixth prediction block, the seventh prediction block, the eighth prediction block, or the ninth prediction block that each corresponds to the first smallest matched distortion value is the target prediction block.

When the first prediction block is the backward prediction block, a second smallest matched distortion value is determined among the first matched distortion value, the sixth matched distortion value, the seventh matched distortion value, the eighth matched distortion value, and the ninth matched distortion value. It is determined that the backward prediction block, the sixth prediction block, the seventh prediction block, the eighth prediction block, or the ninth prediction block that each corresponds to the second smallest matched distortion value is the target prediction block.

The second sample accuracy is different from the first sample accuracy, and the second sample accuracy may be less than or greater than the first sample accuracy. Both the first sample accuracy and the second sample accuracy may be integer sample accuracy or non-integer sample accuracy. Alternatively, the first sample accuracy is integer sample accuracy, and the second sample accuracy is half-sample accuracy.

Optionally, if a pixel obtained by shifting the forward prediction block or the backward prediction block is a non-integer sample, the pixel obtained through the shifting may be adjusted to integer sample accuracy.

It should be noted that, if any one of the second matched distortion value, the third matched distortion value, the fourth matched distortion value, and the fifth matched distortion value is less than the first matched distortion value, the target forward prediction block and the target backward prediction block may be determined in Manner 1.

In this embodiment, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes an SAD between two prediction blocks. The SAD may be calculated in the following manners.

Manner 1. The SAD may be calculated according to the following formula:

$$SAD = \sum_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, L is a quantity of samples in a prediction block, and K is an average between the two prediction blocks.

K may be calculated according to the following formula:

$$K = (\sum_{0 \leq i M <, 0 \leq j < N} P0[i][j] - \sum_{0 \leq i M <, 0 \leq j < N} P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, sixth prediction block, seventh prediction block, eighth prediction block, or ninth prediction block, P1[i][j] is a sample value of a sample in the sampled combined prediction block, and corresponding positions of P0[i][j] and P1[i][j] in the two prediction blocks are the same.

In this manner, when K is calculated, the prediction block is sampled, so that a calculation amount of K is reduced, and calculation complexity of matched distortion values is reduced. A sampling manner is not limited in this embodiment, and an even-numbered sample or an odd-numbered sample may be removed.

Manner 2. The SAD may be calculated in the following manner:

$$SAD = \sum_{n=0}^{n=L-1}[abs(P0[n]-P1[n])],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are same, and L is a quantity of samples in a prediction block.

In this manner, when a matched distortion value is calculated, no average between two prediction blocks needs to be calculated, thereby simplifying calculation of the matched distortion value.

Optionally, in the foregoing two manners, P0[n] is the sample value of the sample in the sampled first prediction block, second prediction block, third prediction block, fourth prediction block, fifth prediction block, sixth prediction block, seventh prediction block, eighth prediction block, or ninth prediction block, and P1[n] is the sample value of the sample in the sampled combined prediction block. Sampling reduces a calculation amount of the SAD and calculation complexity of the matched distortion values.

Manner 3. A difference from Manner 1 lies in that, in Manner 1, the prediction block is sampled when K is calculated, however, in Manner 3, no prediction block is sampled when K is calculated.

Step S205. Determine a target motion vector of the current block based on the target prediction block.

In a bi-directional inter prediction mode, the target motion vector of the current block includes two vectors a first motion vector and a second motion vector. The first motion vector is a position offset of the target forward prediction block relative to the current block, and the second motion vector is a position offset of the target backward prediction block relative to the current block.

In this embodiment, during each search, only matched distortion values between the prediction blocks after the forward prediction block and/or the backward prediction block shift/shifts in four directions (upward, downward, leftward, and rightward) need to be calculated. However, in a conventional technology, matched distortion values between prediction blocks obtained by shifting the forward prediction block and the backward prediction block in a total of five directions (upward, downward, leftward, rightward, and diagonal) need to be calculated during each search. In this way, a calculation amount of matched distortion values is reduced, and motion vector calculation efficiency is improved.

Figure 9:
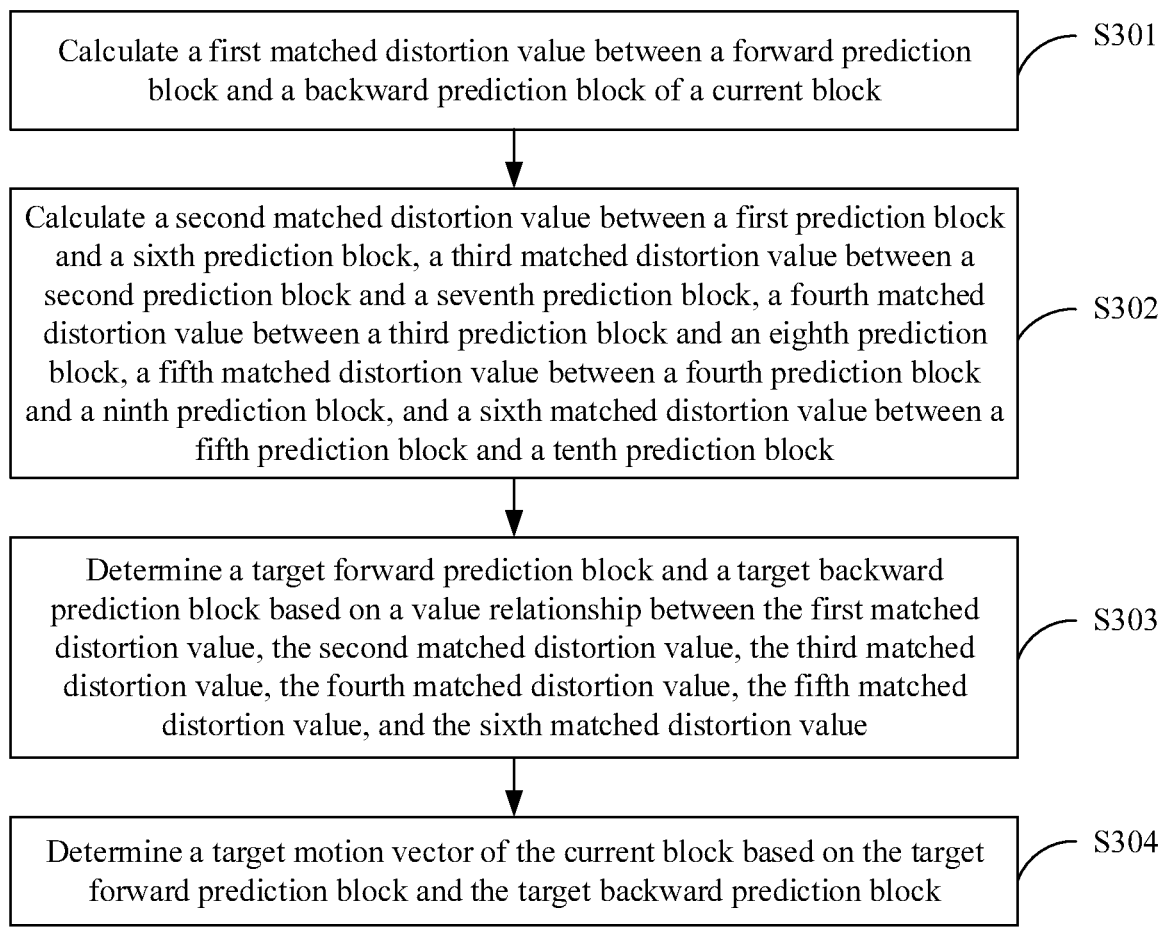
FIG. 9 is a flowchart of a motion vector determining method according to Embodiment 3 of this application.

FIG. 9 is a flowchart of a motion vector determining method according to Embodiment 3 of this application. The method in this embodiment is applied to a bi-directional inter prediction process, and may be applied to an encoder side and a decoder side. When applied to the encoder side, the method may be performed by the ME module in the video encoding apparatus shown in FIG. 1. When applied to the decoder side, the method may be performed by the DMVR module in the video decoding apparatus shown in FIG. 3.

Differences between this embodiment and Embodiment 1 include (1) A forward prediction block and a backward prediction block shift in a total of five directions (upward, downward, leftward, rightward, and diagonal) in this embodiment, while the forward prediction block and the backward prediction block shift in four directions (upward, downward, leftward, and rightward) in Embodiment 1. (2) In this embodiment, a calculation manner of a matched distortion value is different from that in Embodiment 1.

As shown in FIG. 9, the method provided in this embodiment includes the following steps.

Step S301. Calculate a first matched distortion value between a forward prediction block and a backward prediction block of a current block.

Step S302. Calculate a second matched distortion value between a first prediction block and a sixth prediction block, a third matched distortion value between a second prediction block and a seventh prediction block, a fourth matched distortion value between a third prediction block and an eighth prediction block, a fifth matched distortion value between a fourth prediction block and a ninth prediction block, and a sixth matched distortion value between a fifth prediction block and a tenth prediction block.

The first prediction block, the second prediction block, the third prediction block, the fourth prediction block, and the fifth prediction block are respectively prediction blocks obtained by shifting the forward prediction block upward, downward, leftward, rightward, and in a diagonal direction in a forward reference frame. The sixth prediction block, the seventh prediction block, the eighth prediction block, the ninth prediction block, and the tenth prediction block are respectively prediction blocks obtained by shifting the backward prediction block downward, upward, rightward, leftward, and in a reverse direction of the diagonal direction in a backward reference frame.

When the diagonal direction is a top-left, bottom-left, top-right, or bottom-right direction, the reverse direction of the diagonal direction is correspondingly a bottom-right, top-right, bottom-left, or top-left direction.

In this embodiment, the forward prediction block and the backward prediction block shift in a total of five directions (upward, downward, leftward, rightward, and diagonal). During each shifting, shifting directions of the forward prediction block and the backward prediction block are opposite. During each shifting, the forward prediction block and the backward prediction block may shift by using same sample accuracy.

Figure 10:
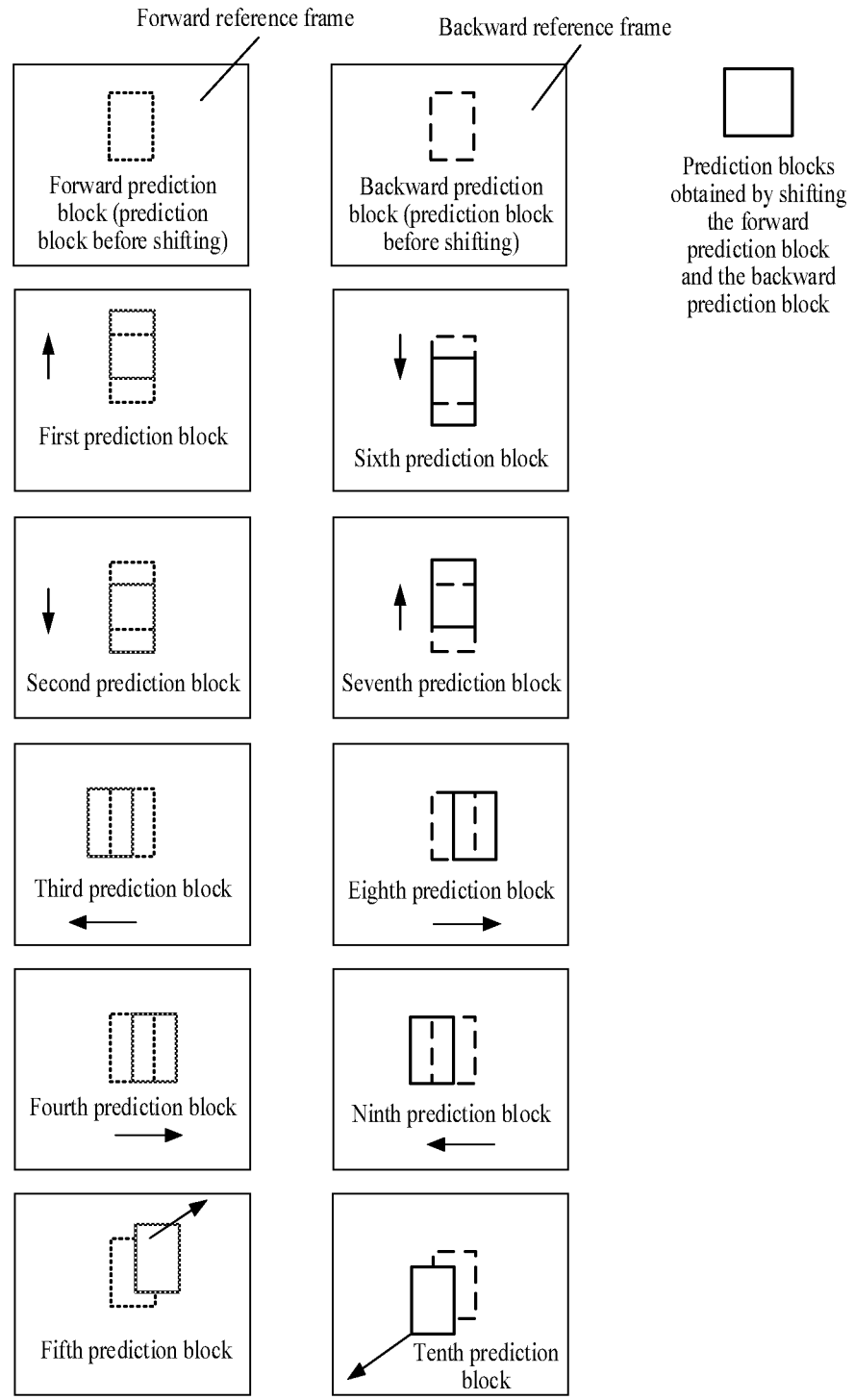
FIG. 10 is still another schematic diagram of shifting of a forward prediction block and a backward prediction block.

FIG. 10 is still another schematic diagram of shifting of the forward prediction block and the backward prediction block. As shown in FIG. 10, solid-line boxes represent prediction blocks obtained by shifting the forward prediction block and the backward prediction block, and arrows in the figure represent shifting directions of the forward prediction block and the backward prediction block. Compared with FIG. 6, in this embodiment, the forward prediction block further shifts toward the top-left direction, and the backward prediction block correspondingly shifts toward the top-right direction.

In this embodiment, the forward prediction block and the backward prediction block may shift in the reference frames based on preset first sample accuracy to obtain other prediction blocks. The first sample accuracy may be integer sample accuracy, or may be non-integer sample accuracy.

Optionally, if a pixel obtained by shifting the forward prediction block or the backward prediction block is a non-integer sample, the pixel obtained through the shifting may be adjusted to integer sample accuracy.

In this embodiment, any one of the first matched distortion value, the second matched distortion value, the third matched distortion value, the fourth matched distortion value, the fifth matched distortion value, and the sixth matched distortion value includes an SAD between two prediction blocks.

The SAD is calculated according to the following formula:

$$SAD=\Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, or the fifth prediction block, P1[n] is correspondingly a sample value of a sample in the backward prediction block, the sixth prediction block, the seventh prediction block, the eighth prediction block, the ninth prediction block, or the tenth prediction block, corresponding positions of P0[n] and P1[n] in the two prediction blocks are the same, L is a quantity of samples in a prediction block, and K is an average between the prediction blocks. K is calculated according to the following formula:

$$K=(\Sigma_{0\leq i M<,0\leq j<N}P0[i][j]-\Sigma_{0\leq i M<,0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, or fifth prediction block, P1[i][j] is correspondingly a sample value of a sample in the sampled backward prediction block, sixth prediction block, seventh prediction block, eighth prediction block, ninth prediction block, or tenth prediction block, and corresponding positions of P0[i][j] and P1[i][j] in the two prediction blocks are the same.

In this manner, when K is calculated, the prediction block is sampled, so that a calculation amount of K is reduced, and calculation complexity of the matched distortion values is reduced. A sampling manner is not limited in this embodiment, and an even-numbered sample or an odd-numbered sample may be removed.

Optionally, the SAD may alternatively be calculated in the following manner:

$$SAD=\Sigma_{n=0}^{n=L-1}[abs(P0[n]-P1[n])],$$

where when P0[n] is a sample value of a sample in the forward prediction block, the first prediction block, the second prediction block, the third prediction block, the fourth prediction block, or the fifth prediction block, P1[n] is correspondingly a sample value of a sample in the backward prediction block, the sixth prediction block, the seventh prediction block, the eighth prediction block, the ninth prediction block, or the tenth prediction block, corresponding positions of P0[n] and P1[n] in the two prediction blocks are the same, and L is a quantity of samples in a prediction block.

Optionally, in the foregoing two manners, P0[n] is the sample value of the sample in the sampled forward prediction block, first prediction block, second prediction block, third prediction block, fourth prediction block, or fifth prediction block, and P1[n] is correspondingly the sample value of the sample in the sampled backward prediction block, sixth prediction block, seventh prediction block, eighth prediction block, ninth prediction block, or tenth prediction block. Sampling reduces a calculation amount of the SAD and calculation complexity of the matched distortion values.

Step S303. Determine a target forward prediction block and a target backward prediction block based on a value relationship between the first matched distortion value, the second matched distortion value, the third matched distortion value, the fourth matched distortion value, the fifth matched distortion value, and the sixth matched distortion value.

For example, the target forward prediction block and the target backward prediction block may be determined in the following two manners.

(Manner 1) A smallest matched distortion value is determined among the first matched distortion value, the second matched distortion value, the third matched distortion value, the fourth matched distortion value, the fifth matched distortion value, and the sixth matched distortion value. It is determined that the forward prediction block, the first prediction block, the second prediction block, the third prediction block, the fourth prediction block, or the fifth prediction block that each corresponds to the smallest matched distortion value is the target forward prediction block. It is determined that the backward prediction block, the sixth prediction block, the seventh prediction block, the eighth prediction block, the ninth prediction block, or the tenth prediction block that each corresponds to the smallest matched distortion value is the target backward prediction block.

When the smallest matched distortion value is the first matched distortion value, in other words, the second matched distortion value, the third matched distortion value, the fourth matched distortion value, the fifth matched distortion value, and the sixth matched distortion value are all greater than or equal to the first matched distortion value, the forward prediction block is the target forward prediction block, and the backward prediction block is the target backward prediction block.

(Manner 2) When the second matched distortion value, the third matched distortion value, the fourth matched distortion value, the fifth matched distortion value, and the sixth matched distortion value are all greater than or equal to the first matched distortion value, a seventh matched distortion value between an eleventh prediction block and a sixteenth prediction block, an eighth matched distortion value between a twelfth prediction block and a seventeenth prediction block, a ninth matched distortion value between a thirteenth prediction block and an eighteenth prediction block, a tenth matched distortion value between a fourteenth prediction block and a nineteenth prediction block, and an eleventh matched distortion value between a fifteenth prediction block and a twentieth prediction block are calculated.

The eleventh prediction block, the twelfth prediction block, the thirteenth prediction block, the fourteenth prediction block, and the fifteenth prediction block are respectively prediction blocks obtained by shifting the forward prediction block upward, downward, leftward, rightward, and in the diagonal direction in the forward reference frame based on second sample accuracy. The sixteenth prediction block, the seventeenth prediction block, the eighteenth prediction block, the nineteenth prediction block, and the twentieth prediction block are respectively prediction blocks obtained by shifting the backward prediction block downward, upward, rightward, leftward, and in the reverse direction of the diagonal direction in the backward reference frame based on the second sample accuracy.

The first prediction block, the second prediction block, the third prediction block, the fourth prediction block, and the fifth prediction block are respectively prediction blocks obtained by shifting the forward prediction block upward, downward, leftward, rightward, and in the diagonal direction in the forward reference frame based on the first sample accuracy. The sixth prediction block, the seventh prediction block, the eighth prediction block, the ninth prediction block, and the tenth prediction block are respectively prediction blocks obtained by shifting the backward prediction block downward, upward, rightward, leftward, and in the reverse direction of the diagonal direction in the backward reference frame based on the first sample accuracy.

A smallest matched distortion value is determined among the first matched distortion value, the seventh matched distortion value, the eighth matched distortion value, the ninth matched distortion value, the tenth matched distortion value, and the eleventh matched distortion value. It is determined that the forward prediction block, the eleventh prediction block, the twelfth prediction block, the thirteenth prediction block, the fourteenth prediction block, or the fifteenth prediction block that each corresponds to the smallest matched distortion value is the target forward prediction block. It is determined that the backward prediction block, the sixteenth prediction block, the seventeenth prediction block, the eighteenth prediction block, the nineteenth prediction block, or the twentieth prediction block that each corresponds to the smallest matched distortion value is the target backward prediction block.

For a calculation manner of the seventh matched distortion value, the eighth matched distortion value, the ninth matched distortion value, the tenth matched distortion value, and the eleventh matched distortion value, refer to the calculation manner of the first matched distortion value, the second matched distortion value, the third matched distortion value, the fourth matched distortion value, and the fifth matched distortion value in step S102. Details are not described herein again.

The first sample accuracy is different from the second sample accuracy, and the second sample accuracy may be greater than or less than the first sample accuracy. Both the first sample accuracy and the second sample accuracy may be integer sample accuracy or non-integer sample accuracy. For example, the first sample accuracy is integer sample accuracy, and the second sample accuracy is non-integer sample accuracy.

When the second sample accuracy may be greater than or less than the first sample accuracy, more refined second sample accuracy is used for search, so that the determined target forward prediction block and the determined target backward prediction block are more accurate.

It should be noted that, if any one of the second matched distortion value, the third matched distortion value, the fourth matched distortion value, the fifth matched distortion value, and the sixth matched distortion value is less than the first matched distortion value, the target forward prediction block and the target backward prediction block may be determined in Manner 1.

Step S304. Determine a target motion vector of the current block based on the target forward prediction block and the target backward prediction block.

In a bi-directional inter prediction mode, the target motion vector of the current block includes two vectors a first motion vector and a second motion vector. The first motion vector is a position offset of the target forward prediction block relative to the current block, and the second motion vector is a position offset of the target backward prediction block relative to the current block.

In this embodiment, when a matched distortion value is calculated, a sampled prediction block is used to calculate an average between prediction blocks, thereby reducing a calculation amount of the average, reducing calculation complexity of the matched distortion values, and improving motion vector calculation efficiency.

Figure 11:
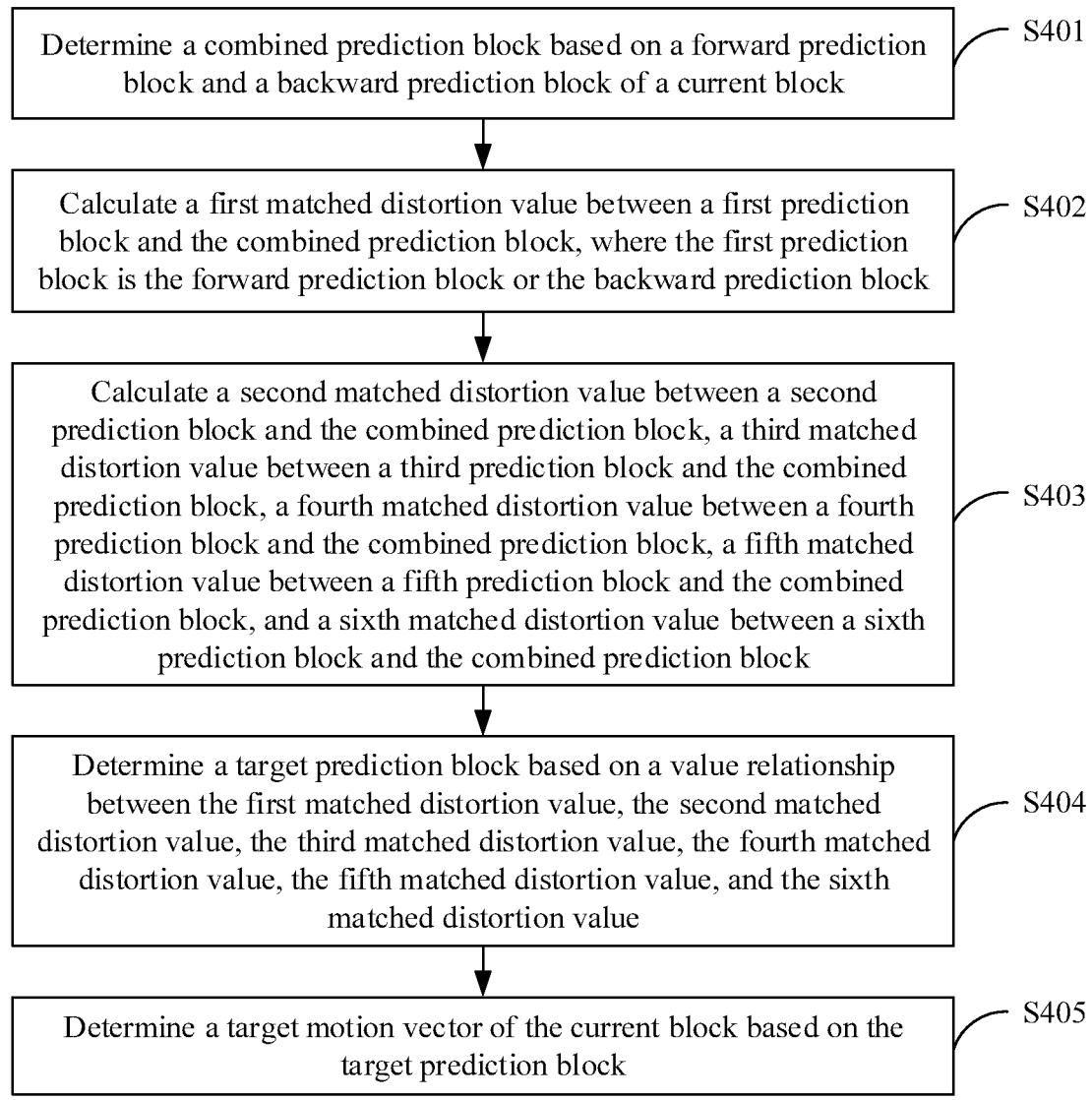
FIG. 11 is a flowchart of a motion vector determining method according to Embodiment 4 of this application.

FIG. 11 is a flowchart of a motion vector determining method according to Embodiment 4 of this application. The method in this embodiment is applied to a bi-directional inter prediction process, and may be applied to an encoder side and a decoder side. When applied to the encoder side, the method may be performed by the ME module in the video encoding apparatus shown in FIG. 1. When applied to the decoder side, the method may be performed by the DMVR module in the video decoding apparatus shown in FIG. 3.

Differences between this embodiment and Embodiment 2 include (1) A first prediction block shifts in a total of five directions (upward, downward, leftward, rightward, and diagonal) in this embodiment, while the first prediction block shifts in four directions (upward, downward, leftward, and rightward) in Embodiment 2. (2) In this embodiment, a calculation manner of a matched distortion value is different from that in Embodiment 2.

As shown in FIG. 11, the method provided in this embodiment includes the following steps.

Step S401. Determine a combined prediction block based on a forward prediction block and a backward prediction block of a current block.

Step S402. Calculate a first matched distortion value between a first prediction block and the combined prediction block, where the first prediction block is the forward prediction block or the backward prediction block.

Step S403. Calculate a second matched distortion value between a second prediction block and the combined prediction block, a third matched distortion value between a third prediction block and the combined prediction block, a fourth matched distortion value between a fourth prediction block and the combined prediction block, a fifth matched distortion value between a fifth prediction block and the combined prediction block, and a sixth matched distortion value between a sixth prediction block and the combined prediction block.

The second prediction block, the third prediction block, the fourth prediction block, the fifth prediction block, and the sixth prediction block are respectively prediction blocks obtained by shifting the first prediction block upward, downward, leftward, rightward, and in a diagonal direction in a reference frame, when the diagonal direction is a top-left, bottom-left, top-right, or bottom-right direction, a reverse direction of the diagonal direction is correspondingly a bottom-right, top-right, bottom-left, or top-left direction. When the first prediction block is the forward prediction block, the reference frame is a forward reference frame. When the first prediction block is the backward prediction block, the reference frame is a backward reference frame.

In this embodiment, the forward prediction block and the backward prediction block shift in a total of five directions (upward, downward, leftward, rightward, and diagonal). During each shifting, shifting directions of the forward prediction block and the backward prediction block are opposite. During each shifting, the forward prediction block and the backward prediction block may shift by using same sample accuracy.

Figure 12:
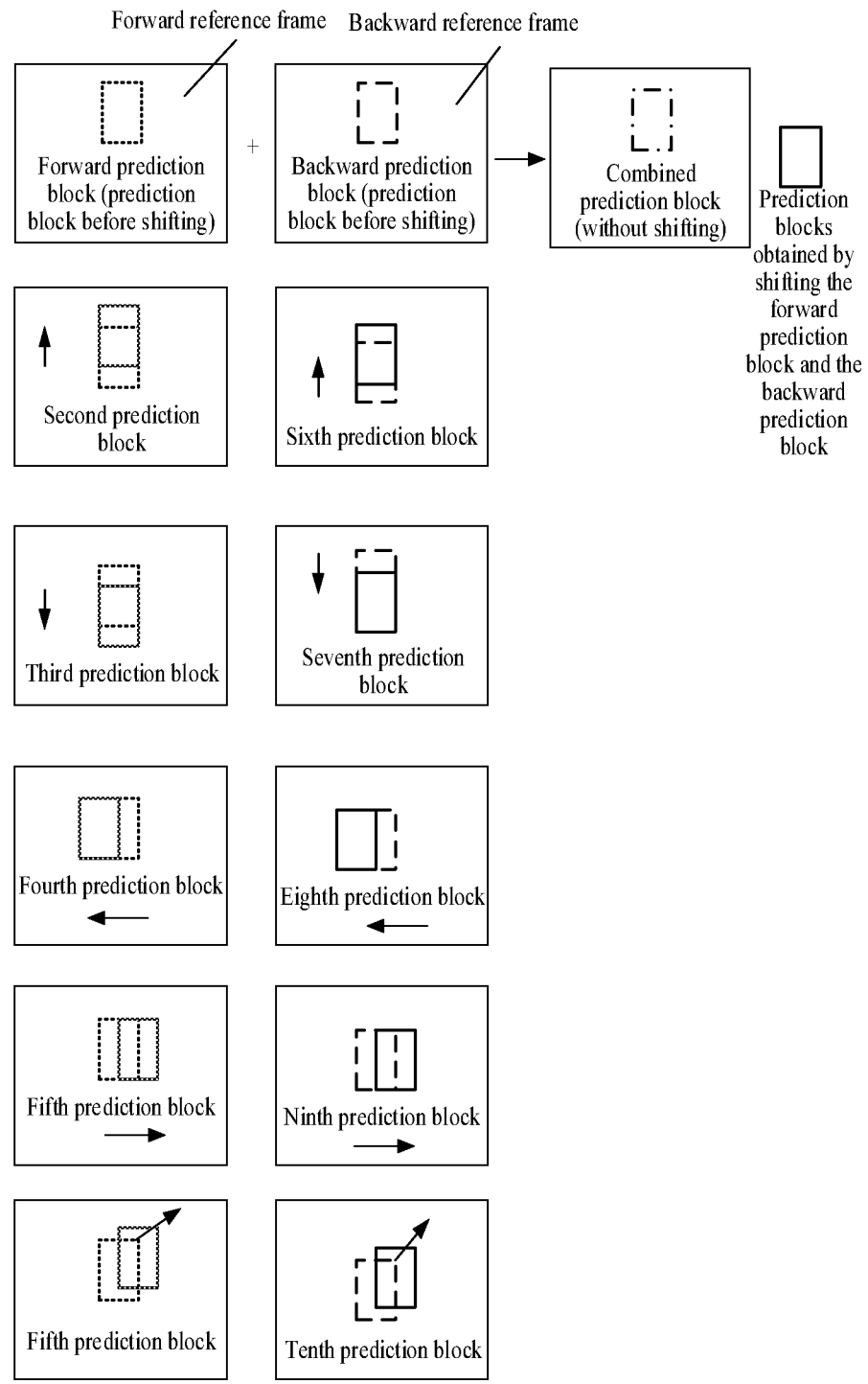
FIG. 12 is yet another schematic diagram of shifting of a forward prediction block and a backward prediction block.

FIG. 12 is yet another schematic diagram of shifting of the forward prediction block and the backward prediction block. Compared with FIG. 8, in this embodiment, the forward prediction block further shifts toward the top-left direction, and the backward prediction block correspondingly shifts toward the bottom-right direction.

In this embodiment, the forward prediction block and the backward prediction block may shift in the reference frames based on preset first sample accuracy to obtain other prediction blocks. The first sample accuracy may be integer sample accuracy, or may be non-integer sample accuracy.

Optionally, if a pixel obtained by shifting the forward prediction block or the backward prediction block is a non-integer sample, the pixel obtained through the shifting may be adjusted to integer sample accuracy.

In this embodiment, any one of the first matched distortion value, the second matched distortion value, the third matched distortion value, the fourth matched distortion value, the fifth matched distortion value, and the sixth matched distortion value includes an SAD between two prediction blocks.

The SAD may be calculated according to the following formula:

$$SAD = \Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, or the sixth prediction block, P1[n] is a sample value of a sample in the combined prediction block, corresponding positions of P0[n] and P1[n] in the two prediction blocks are the same, L is a quantity of samples in a prediction block, and K is an average between the prediction blocks. K is calculated according to the following formula:

$$K = (\Sigma_{0 \leq i M <, 0 \leq j < N} P0[i][j] - \Sigma_{0 \leq i M <, 0 \leq j < N} P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, or sixth prediction block, P1[i][j] is a sample value of a sample in the sampled combined prediction block, and corresponding positions of P0[i][j] and P1[i][j] in the two prediction blocks are the same.

In this manner, when K is calculated, the prediction block is sampled, so that a calculation amount of K is reduced, and calculation complexity of the matched distortion values is reduced. A sampling manner is not limited in this embodiment, and an even-numbered sample or an odd-numbered sample may be removed.

Optionally, the SAD may alternatively be calculated in the following manner:

$$SAD = \Sigma_{n=0}^{n=L-1}[abs(P0[n]-P1[n])],$$

where P0[n] is a sample value of a sample in the first prediction block, the second prediction block, the third prediction block, the fourth prediction block, the fifth prediction block, or the sixth prediction block, P1[n] is a sample value of a sample in the combined prediction block, corresponding positions of P0[n] and P1[n] in the two prediction blocks are the same, and L is a quantity of samples in a prediction block.

Optionally, in the foregoing two manners, P0[n] is the sample value of the sample in the sampled first prediction block, second prediction block, third prediction block, fourth prediction block, fifth prediction block, or sixth prediction block, and P1[n] is the sample value of the sample in the sampled combined prediction block. Sampling reduces a calculation amount of the SAD and calculation complexity of the matched distortion values.

Step S404. Determine a target prediction block based on a value relationship between the first matched distortion value, the second matched distortion value, the third matched distortion value, the fourth matched distortion value, the fifth matched distortion value, and the sixth matched distortion value.

For example, the target prediction block may be determined in the following manners.

(Manner 1) When the first prediction block is the forward prediction block, a first smallest matched distortion value is determined among the first matched distortion value, the second matched distortion value, the third matched distortion value, the fourth matched distortion value, the fifth matched distortion value, and the sixth matched distortion value that correspond to the forward prediction block. It is determined that the forward prediction block, the second prediction block, the third prediction block, the fourth prediction block, the fifth prediction block, or the sixth prediction block that each corresponds to the first smallest matched distortion value is the target prediction block.

When the first prediction block is the backward prediction block, a second smallest matched distortion value is determined among the first matched distortion value, the second matched distortion value, the third matched distortion value, the fourth matched distortion value, the fifth matched distortion value, and the sixth matched distortion value that correspond to the backward prediction block. It is determined that the backward prediction block, the second prediction block, the third prediction block, the fourth prediction block, the fifth prediction block, or the sixth prediction block that each corresponds to the second smallest matched distortion value is the target prediction block.

When the first smallest matched distortion value is the first matched distortion value, in other words, the second matched distortion value, the third matched distortion value, the fourth matched distortion value, the fifth matched distortion value, and the sixth matched distortion value that correspond to the forward prediction block are all greater than or equal to the first matched distortion value, the forward prediction block is the target prediction block. When the second smallest matched distortion value is the first matched distortion value, in other words, the second matched distortion value, the third matched distortion value, the fourth matched distortion value, the fifth matched distortion value, and the sixth matched distortion value that correspond to the backward prediction block are all greater than or equal to the first matched distortion value, the backward prediction block is the target prediction block.

(Manner 2) When the second matched distortion value, the third matched distortion value, the fourth matched distortion value, the fifth matched distortion value, and the sixth matched distortion value are all greater than or equal to the first matched distortion value, a seventh matched distortion value between a seventh prediction block and the combined prediction block, an eighth matched distortion value between an eighth prediction block and the combined prediction block, a ninth matched distortion value between a ninth prediction block and the combined prediction block, a tenth matched distortion value between a tenth prediction block and the combined prediction block, and an eleventh matched distortion value between an eleventh prediction block and the combined prediction block are calculated.

The seventh prediction block, the eighth prediction block, the ninth prediction block, the tenth prediction block, and the eleventh prediction block are respectively prediction block obtained by shifting the first prediction block upward, downward, leftward, rightward, and in the diagonal direction in the reference frame based on second sample accuracy. The second prediction block, the third prediction block, the fourth prediction block, the fifth prediction block, and the sixth prediction block are respectively prediction block obtained by shifting the first prediction block upward, downward, leftward, rightward, and in the diagonal direction in the reference frame based on the first sample accuracy.

When the first prediction block is the forward prediction block, a smallest matched distortion value is determined among the first matched distortion value, the seventh matched distortion value, the eighth matched distortion value, the ninth matched distortion value, the tenth matched distortion value, and the eleventh matched distortion value. It is determined that the forward prediction block, the seventh prediction block, the eighth prediction block, the ninth prediction block, the tenth prediction block, or the eleventh prediction block that each corresponds to the first smallest matched distortion value is the target prediction block.

When the first prediction block is the backward prediction block, a second smallest matched distortion value is determined among the first matched distortion value, the seventh matched distortion value, the eighth matched distortion value, the ninth matched distortion value, the tenth matched distortion value, and the eleventh matched distortion value. It is determined that the backward prediction block, the seventh prediction block, the eighth prediction block, the ninth prediction block, the tenth prediction block, or the eleventh prediction block that each corresponds to the second smallest matched distortion value is the target prediction block.

For a calculation manner of the seventh matched distortion value, the eighth matched distortion value, the ninth matched distortion value, the tenth matched distortion value, and the eleventh matched distortion value, refer to the calculation manner of the first matched distortion value, the second matched distortion value, the third matched distortion value, the fourth matched distortion value, and the fifth matched distortion value in step S102. Details are not described herein again.

The first sample accuracy is different from the second sample accuracy, and the second sample accuracy may be greater than or less than the first sample accuracy. Both the first sample accuracy and the second sample accuracy may be integer sample accuracy or non-integer sample accuracy. For example, the first sample accuracy is integer sample accuracy, and the second sample accuracy is non-integer sample accuracy.

When the second sample accuracy may be greater than or less than the first sample accuracy, more refined second sample accuracy is used for search, so that a determined target forward prediction block and a determined target backward prediction block are more accurate.

It should be noted that, if any one of the second matched distortion value, the third matched distortion value, the fourth matched distortion value, the fifth matched distortion value, and the sixth matched distortion value is less than the first matched distortion value, the target forward prediction block and the target backward prediction block may be determined in Manner 1.

Step S405. Determine a target motion vector of the current block based on the target prediction block.

In this embodiment, when a matched distortion value is calculated, a sampled prediction block is used to calculate an average between prediction blocks, thereby reducing a calculation amount of the average, reducing calculation complexity of the matched distortion values, and improving motion vector calculation efficiency.

Figure 13:
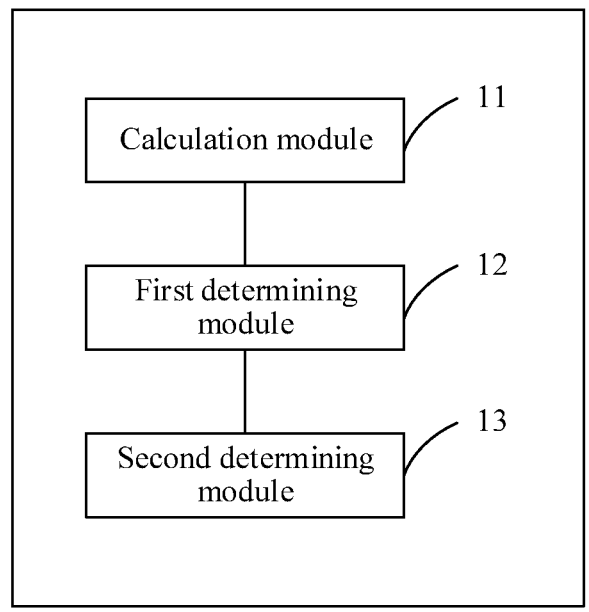
FIG. 13 is a schematic diagram of a motion vector determining apparatus according to Embodiment 5 of this application.

FIG. 13 is a schematic diagram of a motion vector determining apparatus according to Embodiment 5 of this application. As shown in FIG. 13, the apparatus in this embodiment includes a calculation module 11, configured to calculate a first matched distortion value between a forward prediction block and a backward prediction block of a current block, where the calculation module 11 is further configured to calculate only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, where the first prediction block, the second prediction block, the third prediction block, and the fourth prediction block are respectively prediction blocks obtained by shifting the forward prediction block upward, downward, leftward, and rightward in a forward reference frame, and the fifth prediction block, the sixth prediction block, the seventh prediction block, and the eighth prediction block are respectively prediction blocks obtained by shifting the backward prediction block downward, upward, rightward, and leftward in a backward reference frame, a first determining module 12, configured to determine a target forward prediction block and a target backward prediction block based on a value relationship between the first matched distortion value, the second matched distortion value, the third matched distortion value, the fourth matched distortion value, and the fifth matched distortion value, and a second determining module 13, configured to determine a target motion vector of the current block based on the target forward prediction block and the target backward prediction block.

In a possible implementation, the first determining module 12 is specifically configured to determine a smallest matched distortion value among the first matched distortion value, the second matched distortion value, the third matched distortion value, the fourth matched distortion value, and the fifth matched distortion value, and determine that the forward prediction block, the first prediction block, the second prediction block, the third prediction block, or the fourth prediction block that each corresponds to the smallest matched distortion value is the target forward prediction block, and determine that the backward prediction block, the fifth prediction block, the sixth prediction block, the seventh prediction block, or the eighth prediction block that each corresponds to the smallest matched distortion value is the target backward prediction block.

In a possible implementation, the first prediction block, the second prediction block, the third prediction block, and the fourth prediction block are respectively prediction blocks obtained by shifting the forward prediction block upward, downward, leftward, and rightward in the forward reference frame based on first sample accuracy, and the fifth prediction block, the sixth prediction block, the seventh prediction block, and the eighth prediction block are respectively prediction blocks obtained by shifting the backward prediction block downward, upward, rightward, and leftward in the backward reference frame based on the first sample accuracy, The calculation module 11 is further configured to, when the second matched distortion value, the third matched distortion value, the fourth matched distortion value, and the fifth matched distortion value are all greater than or equal to the first matched distortion value, calculate only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block, where the ninth prediction block, the tenth prediction block, the eleventh prediction block, and the twelfth prediction block are respectively prediction blocks obtained by shifting the forward prediction block upward, downward, leftward, and rightward in the forward reference frame based on second sample accuracy, and the thirteenth prediction block, the fourteenth prediction block, the fifteenth prediction block, and the sixteenth prediction block are respectively prediction blocks obtained by shifting the backward prediction block downward, upward, rightward, and leftward in the backward reference frame based on the second sample accuracy.

The first determining module 12 is specifically configured to determine a smallest matched distortion value among the first matched distortion value, the sixth matched distortion value, the seventh matched distortion value, the eighth matched distortion value, and the ninth matched distortion value, and determine that the forward prediction block, the ninth prediction block, the tenth prediction block, the eleventh prediction block, or the twelfth prediction block that each corresponds to the smallest matched distortion value is the target forward prediction block, and determine that the backward prediction block, the thirteenth prediction block, the fourteenth prediction block, the fifteenth prediction block, or the sixteenth prediction block that each corresponds to the smallest matched distortion value is the target backward prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes a sum of absolute differences SAD between two prediction blocks, where the SAD is calculated according to the following formula:

$$SAD=\Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, L is a quantity of samples in a prediction block, and K is an average between the two prediction blocks, and K is calculated according to the following formula:

$$K=(\Sigma_{0\leq i M<,0\leq j<N}P0[i][j]-\Sigma_{0\leq i M<,0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, ninth prediction block, tenth prediction block, eleventh prediction block, or twelfth prediction block, P1[i][j] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, and corresponding positions of P0[i][j] and P1[i][j] in the two prediction blocks are the same.

In a possible implementation, the first sample accuracy is integer sample accuracy, and the second sample accuracy is half-sample accuracy.

In a possible implementation, the SAD is calculated according to the following formula:

$$SAD = \Sum_{n=0}^{n=L-1}[abs(P0[n]-P1[n])],$$

where when P0[n] is a sample value of a sample in the forward prediction block, the first prediction block, the second prediction block, the third prediction block, the fourth prediction block, the ninth prediction block, the tenth prediction block, the eleventh prediction block, or the twelfth prediction block, P1[n] is correspondingly a sample value of a sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block, corresponding positions of P0[n] and P1[n] in the two prediction blocks are the same, and L is a quantity of samples in a prediction block.

In a possible implementation, when P0[n] is a sample value of a sample in the sampled forward prediction block, first prediction block, second prediction block, third prediction block, fourth prediction block, ninth prediction block, tenth prediction block, eleventh prediction block, or twelfth prediction block, P1[n] is correspondingly a sample value of a sample in the sampled backward prediction block, fifth prediction block, sixth prediction block, seventh prediction block, eighth prediction block, thirteenth prediction block, fourteenth prediction block, fifteenth prediction block, or sixteenth prediction block, corresponding positions of P0[n] and P1[n] in the two sampled prediction blocks are the same, and L is a quantity of samples in a sampled prediction block.

The apparatus in this embodiment may be configured to perform the method in Embodiment 1. A specific implementation and a technical effect are similar to those of the method in Embodiment 1, and details are not described herein. It should be noted that the calculation module 11, the first determining module 12, and the second determining module 13 may be applied to a motion vector determining process on an encoder side or a decoder side.

Figure 14:
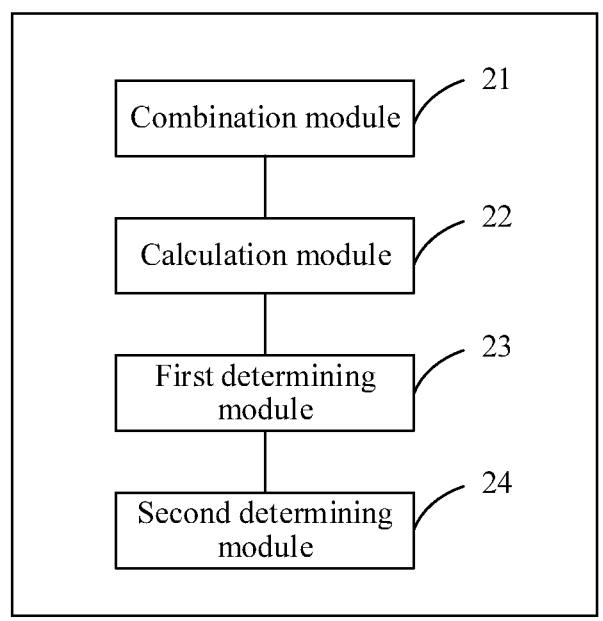
FIG. 14 is a schematic diagram of a motion vector determining apparatus according to Embodiment 6 of this application.

FIG. 14 is a schematic diagram of a motion vector determining apparatus according to Embodiment 6 of this application. As shown in FIG. 14, the apparatus in this embodiment includes a combination module 21, configured to determine a combined prediction block based on a forward prediction block and a backward prediction block of a current block, a calculation module 22, configured to calculate a first matched distortion value between the first prediction block and the combined prediction block, where the first prediction block is the forward prediction block or the backward prediction block, and the calculation module 22 is further configured to calculate only a second matched distortion value between a second prediction block and the combined prediction block, a third matched distortion value between a third prediction block and the combined prediction block, a fourth matched distortion value between a fourth prediction block and the combined prediction block, and a fifth matched distortion value between a fifth prediction block and the combined prediction block, where the second prediction block, the third prediction block, the fourth prediction block, and the fifth prediction block are respectively prediction blocks obtained by shifting the first prediction block upward, downward, leftward, and rightward in a reference frame, a first determining module 23, configured to determine a target prediction block based on a value relationship between the first matched distortion value, the second matched distortion value, the third matched distortion value, the fourth matched distortion value, and the fifth matched distortion value, and a second determining module 24, configured to determine a target motion vector of the current block based on the target prediction block.

In a possible implementation, the first determining module 23 is specifically configured to, when the first prediction block is the forward prediction block, determine a first smallest matched distortion value among the first matched distortion value, the second matched distortion value, the third matched distortion value, the fourth matched distortion value, and the fifth matched distortion value that correspond to the forward prediction block, determine that the forward prediction block, the second prediction block, the third prediction block, the fourth prediction block, or the fifth prediction block that each corresponds to the first smallest matched distortion value is the target prediction block, when the first prediction block is the backward prediction block, determine a second smallest matched distortion value among the first matched distortion value, the second matched distortion value, the third matched distortion value, the fourth matched distortion value, and the fifth matched distortion value that correspond to the backward prediction block, and determine that the backward prediction block, the second prediction block, the third prediction block, the fourth prediction block, or the fifth prediction block that each corresponds to the second smallest matched distortion value is the target prediction block.

In a possible implementation, the second prediction block, the third prediction block, the fourth prediction block, and the fifth prediction block are respectively prediction blocks obtained by shifting the first prediction block upward, downward, leftward, and rightward in the reference frame based on first sample accuracy.

The calculation module 22 is further configured to, when the second matched distortion value, the third matched distortion value, the fourth matched distortion value, and the fifth matched distortion value are all greater than or equal to the first matched distortion value, calculate only a sixth matched distortion value between a sixth prediction block and the combined prediction block, a seventh matched distortion value between a seventh prediction block and the combined prediction block, an eighth matched distortion value between an eighth prediction block and the combined prediction block, and a ninth matched distortion value between a ninth prediction block and the combined prediction block, where the sixth prediction block, the seventh prediction block, the eighth prediction block, and the ninth prediction block are respectively prediction blocks obtained by shifting the first prediction block upward, downward, leftward, and rightward in the reference frame based on second sample accuracy.

The first determining module 23 is specifically configured to, when the first prediction block is the forward prediction block, determine a first smallest matched distortion value among the first matched distortion value, the sixth matched distortion value, the seventh matched distortion value, the eighth matched distortion value, and the ninth matched distortion value, determine that the forward prediction block, the sixth prediction block, the seventh prediction block, the eighth prediction block, or the ninth prediction block that each corresponds to the first smallest matched distortion value is the target prediction block, when the first prediction block is the backward prediction block, determine a second smallest matched distortion value among the first matched distortion value, the sixth matched distortion value, the seventh matched distortion value, the eighth matched distortion value, and the ninth matched distortion value, and determine that the backward prediction block, the sixth prediction block, the seventh prediction block, the eighth prediction block, or the ninth prediction block that each corresponds to the second smallest matched distortion value is the target prediction block.

In a possible implementation, any one of the first matched distortion value, the second matched distortion value, the third matched distortion value, the fourth matched distortion value, the fifth matched distortion value, the sixth matched distortion value, the seventh matched distortion value, the eighth matched distortion value, and the ninth matched distortion value includes a sum of absolute differences SAD between two prediction blocks, where the SAD is calculated according to the following formula:

$$SAD = \Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, L is a quantity of samples in a prediction block, and K is an average between the two prediction blocks, and K is calculated according to the following formula:

$$K = (\Sigma_{0 \leq i M <, 0 \leq j < N} P0[i][j] - \Sigma_{0 \leq i M <, 0 \leq j < N} P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, sixth prediction block, seventh prediction block, eighth prediction block, or ninth prediction block, P1[i][j] is a sample value of a sample in the sampled combined prediction block, and corresponding positions of P0[i][j] and P1[i][j] in the two prediction blocks are the same.

In a possible implementation, the first sample accuracy is integer sample accuracy, and the second sample accuracy is half-sample accuracy.

In a possible implementation, the SAD is calculated according to the following formula:

$$SAD = \Sigma_{n=0}^{n=L-1}[abs(P0[n]-P1[n])],$$

where P0[n] is a sample value of a sample in the first prediction block, the second prediction block, the third prediction block, the fourth prediction block, the fifth prediction block, the sixth prediction block, the seventh prediction block, the eighth prediction block, or the ninth prediction block, P1[n] is a sample value of a sample in the combined prediction block, corresponding positions of P0[n] and P1[n] in the two prediction blocks are the same, and L is a quantity of samples in a prediction block.

In a possible implementation, P0[n] is a sample value of a sample in the sampled first prediction block, second prediction block, third prediction block, fourth prediction block, fifth prediction block, sixth prediction block, seventh prediction block, eighth prediction block, or ninth prediction block, P1[n] is a sample value of a sample in the sampled combined prediction block, corresponding positions of P0[n] and P1[n] in the two sampled prediction blocks are the same, and L is a quantity of samples in a sampled prediction block.

The apparatus in this embodiment may be configured to perform the method in Embodiment 2. A specific implementation and a technical effect are similar to those of the method in Embodiment 2, and details are not described herein again. It should be noted that the combination module 21, the calculation module 22, the first determining module 23, and the second determining module 24 may be applied to a motion vector determining process on an encoder side or a decoder side.

Figure 15:
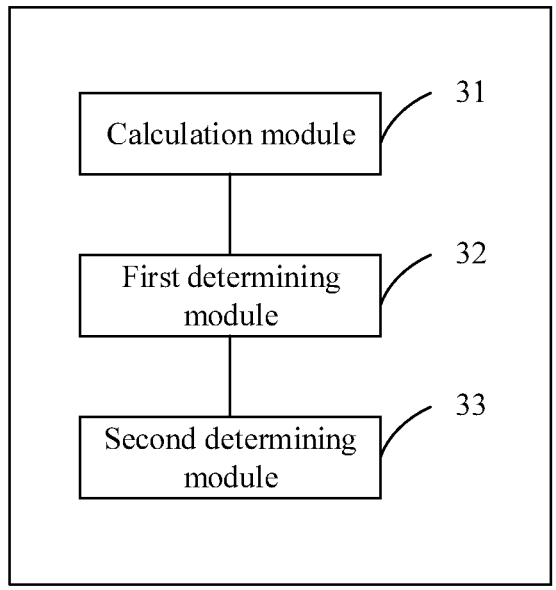
FIG. 15 is a schematic diagram of a motion vector determining apparatus according to Embodiment 7 of this application.

FIG. 15 is a schematic diagram of a motion vector determining apparatus according to Embodiment 7 of this application. As shown in FIG. 15, the apparatus in this embodiment includes a calculation module 31, configured to calculate a first matched distortion value between a forward prediction block and a backward prediction block of a current block, where the calculation module 31 is further configured to calculate a second matched distortion value between a first prediction block and a sixth prediction block, a third matched distortion value between a second prediction block and a seventh prediction block, a fourth matched distortion value between a third prediction block and an eighth prediction block, a fifth matched distortion value between a fourth prediction block and a ninth prediction block, and a sixth matched distortion value between a fifth prediction block and a tenth prediction block, where the first prediction block, the second prediction block, the third prediction block, the fourth prediction block, and the fifth prediction block are respectively prediction blocks obtained by shifting the forward prediction block upward, downward, leftward, rightward, and in a diagonal direction in a forward reference frame, the sixth prediction block, the seventh prediction block, the eighth prediction block, the ninth prediction block, and the tenth prediction block are respectively prediction blocks obtained by shifting the backward prediction block downward, upward, rightward, leftward, and in a reverse direction of the diagonal direction in a backward reference frame, when the diagonal direction is a top-left, bottom-left, top-right, or bottom-right direction, the reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes a sum of absolute differences SAD between two prediction blocks, where the SAD is calculated according to the following formula:

$$SAD = \Sigma_{n=0}^{n=L-1}[abs(P0[n]-P1[n]-K)],$$

where when P0[n] is a sample value of a sample in the forward prediction block, the first prediction block, the second prediction block, the third prediction block, the fourth prediction block, or the fifth prediction block, P1[n] is correspondingly a sample value of a sample in the backward prediction block, the sixth prediction block, the seventh prediction block, the eighth prediction block, the ninth prediction block, or the tenth prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0\leq iM<,0\leq j<N}P0[i][j]-\Sigma_{0\leq iM<,0\leq j<N}P1[i][j])/M*N,$$

where M is a quantity of samples in a sampled prediction block in a width direction, N is a quantity of samples in the sampled prediction block in a height direction, i and j are sample numbers, when P0[i][j] is a sample value of a sample in the sampled forward prediction block, first prediction block, second prediction block, third prediction block, fourth prediction block, or fifth prediction block, PIN [j] is correspondingly a sample value of a sample in the sampled backward prediction block, sixth prediction block, seventh prediction block, eighth prediction block, ninth prediction block, or tenth prediction block, and corresponding positions of P0[i][j] and P1[i][j] in the two prediction blocks are the same, a first determining module 32, configured to determine a target forward prediction block and a target backward prediction block based on a value relationship between the first matched distortion value, the second matched distortion value, the third matched distortion value, the fourth matched distortion value, the fifth matched distortion value, and the sixth matched distortion value, and the second determining module 33, further configured to determine a target motion vector of the current block based on the target forward prediction block and the target backward prediction block.

In a possible implementation, the first determining module 32 is specifically configured to determine a smallest matched distortion value among the first matched distortion value, the second matched distortion value, the third matched distortion value, the fourth matched distortion value, the fifth matched distortion value, and the sixth matched distortion value, and determine that the forward prediction block, the first prediction block, the second prediction block, the third prediction block, the fourth prediction block, or the fifth prediction block that each corresponds to the smallest matched distortion value is the target forward prediction block, and determine that the backward prediction block, the sixth prediction block, the seventh prediction block, the eighth prediction block, the ninth prediction block, or the tenth prediction block that each corresponds to the smallest matched distortion value is the target backward prediction block.

In a possible implementation, the first prediction block, the second prediction block, the third prediction block, the fourth prediction block, and the fifth prediction block are respectively prediction blocks obtained by shifting the forward prediction block upward, downward, leftward, rightward, and in the diagonal direction in the forward reference frame based on first sample accuracy, and the sixth prediction block, the seventh prediction block, the eighth prediction block, the ninth prediction block, and the tenth prediction block are respectively prediction blocks obtained by shifting the backward prediction block downward, upward, rightward, leftward, and in the reverse direction of the diagonal direction in the backward reference frame based on the first sample accuracy.

The calculation module 31 is further configured to, when the second matched distortion value, the third matched distortion value, the fourth matched distortion value, the fifth matched distortion value, and the sixth matched distortion value are all greater than or equal to the first matched distortion value, calculate a seventh matched distortion value between an eleventh prediction block and a sixteenth prediction block, an eighth matched distortion value between a twelfth prediction block and a seventeenth prediction block, a ninth matched distortion value between a thirteenth prediction block and an eighteenth prediction block, a tenth matched distortion value between a fourteenth prediction block and a nineteenth prediction block, and an eleventh matched distortion value between a fifteenth prediction block and a twentieth prediction block, where the eleventh prediction block, the twelfth prediction block, the thirteenth prediction block, the fourteenth prediction block, and the fifteenth prediction block are respectively prediction blocks obtained by shifting the forward prediction block upward, downward, leftward, rightward, and in the diagonal direction in the forward reference frame based on second sample accuracy, and the sixteenth prediction block, the seventeenth prediction block, the eighteenth prediction block, the nineteenth prediction block, and the twentieth prediction block are respectively prediction blocks obtained by shifting the backward prediction block downward, upward, rightward, leftward, and in the reverse direction of the diagonal direction in the backward reference frame based on the second sample accuracy.

The first determining module 32 is specifically configured to determine a smallest matched distortion value among the first matched distortion value, the seventh matched distortion value, the eighth matched distortion value, the ninth matched distortion value, the tenth matched distortion value, and the eleventh matched distortion value, and determine that the forward prediction block, the eleventh prediction block, the twelfth prediction block, the thirteenth prediction block, the fourteenth prediction block, or the fifteenth prediction block that each corresponds to the smallest matched distortion value is the target forward prediction block, and determine that the backward prediction block, the sixteenth prediction block, the seventeenth prediction block, the eighteenth prediction block, the nineteenth prediction block, or the twentieth prediction block that each corresponds to the smallest matched distortion value is the target backward prediction block.

In a possible implementation, the first sample accuracy is integer sample accuracy, and the second sample accuracy is half-sample accuracy.

In a possible implementation, when P0[n] is a sample value of a sample in the sampled forward prediction block, first prediction block, second prediction block, third prediction block, fourth prediction block, or fifth prediction block, P1[n] is correspondingly a sample value of a sample in the sampled backward prediction block, sixth prediction block, seventh prediction block, eighth prediction block, ninth prediction block, or tenth prediction block, corresponding positions of P0[n] and P1[n] in the two sampled prediction blocks are the same, and L is a quantity of samples in a sampled prediction block.

The apparatus in this embodiment may be configured to perform the method in Embodiment 3. A specific implementation and a technical effect are similar to those of Embodiment 3, and details are not described herein. It should be noted that the calculation module 31, the first determining module 32, and the second determining module 33 may be applied to a motion vector determining process on an encoder side or a decoder side.

Figure 16:
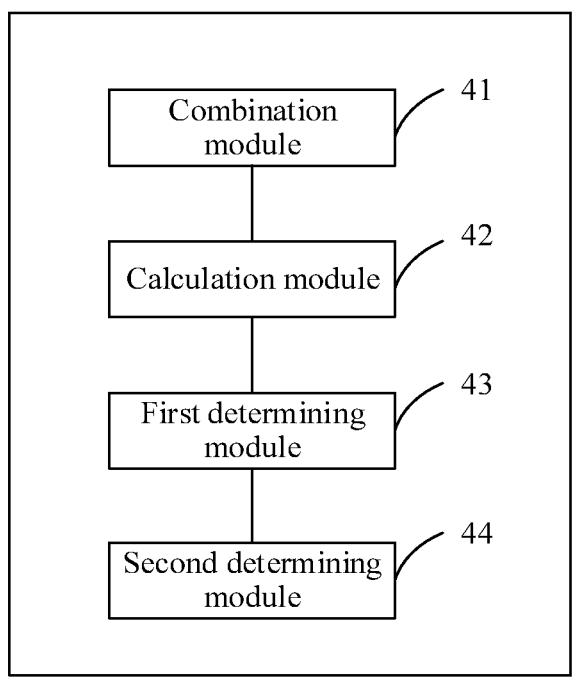
FIG. 16 is a schematic diagram of a motion vector determining apparatus according to Embodiment 8 of this application.

FIG. 16 is a schematic diagram of a motion vector determining apparatus according to Embodiment 8 of this application. As shown in FIG. 16, the apparatus in this embodiment includes a combination module 41, configured to determine a combined prediction block based on a forward prediction block and a backward prediction block of a current block, a calculation module 42, configured to calculate a first matched distortion value between the first prediction block and the combined prediction block, where the first prediction block is the forward prediction block or the backward prediction block, and the calculation module 42 is further configured to calculate a second matched distortion value between a second prediction block and the combined prediction block, a third matched distortion value between a third prediction block and the combined prediction block, a fourth matched distortion value between a fourth prediction block and the combined prediction block, a fifth matched distortion value between a fifth prediction block and the combined prediction block, and a sixth matched distortion value between a sixth prediction block and the combined prediction block, where the second prediction block, the third prediction block, the fourth prediction block, the fifth prediction block, and the sixth prediction block are respectively prediction blocks obtained by shifting the first prediction block upward, downward, leftward, rightward, and in a diagonal direction in a reference frame, when the diagonal direction is a top-left, bottom-left, top-right, or bottom-right direction, a reverse direction of the diagonal direction is correspondingly a bottom-right, top-right, bottom-left, or top-left direction, and any one of the first matched distortion value, the second matched distortion value, the third matched distortion value, the fourth matched distortion value, the fifth matched distortion value, and the sixth matched distortion value includes a sum of absolute differences SAD between two prediction blocks, where the SAD is calculated according to the following formula:

$$SAD=\Sigma_{n=0}^{n=L-1}[abs(P0[n]-P1[n]-K)],$$

where P0[n] is a sample value of a sample in the first prediction block, the second prediction block, the third prediction block, the fourth prediction block, the fifth prediction block, or the sixth prediction block, P1[n] is a sample value of a sample in the combined prediction block, corresponding positions of P0[n] and P1[n] in the two prediction blocks are the same, L is a quantity of samples in a prediction block, and K is an average between the prediction blocks, and K is calculated according to the following formula:

$$K=(\Sigma_{0\leq i M<,0\leq j<N}P0[i][j]-\Sigma_{0\leq i M<,0\leq j<N}P1[i][j])/M*N,$$

where M is a quantity of samples in a sampled prediction block in a width direction, N is a quantity of samples in the sampled prediction block in a height direction, i and j are sample numbers, P0[i][j] is a sample value of a sample in the sampled first prediction block, second prediction block, third prediction block, fourth prediction block, fifth prediction block, or sixth prediction block, P1[i][j] is a sample value of a sample in the sampled combined prediction block, and corresponding positions of P0[i][j] and P1[i][j] in the two prediction blocks are the same, a first determining module 43, configured to determine a target prediction block based on a value relationship between the first matched distortion value, the second matched distortion value, the third matched distortion value, the fourth matched distortion value, the fifth matched distortion value, and the sixth matched distortion value, and a second determining module 44, configured to determine a target motion vector of the current block based on the target prediction block.

In a possible implementation, the first determining module 43 is specifically configured to, when the first prediction block is the forward prediction block, determine a first smallest matched distortion value among the first matched distortion value, the second matched distortion value, the third matched distortion value, the fourth matched distortion value, the fifth matched distortion value, and the sixth matched distortion value that correspond to the forward prediction block, determine that the forward prediction block, the second prediction block, the third prediction block, the fourth prediction block, the fifth prediction block, or the sixth prediction block that each corresponds to the first smallest matched distortion value is the target prediction block, when the first prediction block is the backward prediction block, determine a second smallest matched distortion value among the first matched distortion value, the second matched distortion value, the third matched distortion value, the fourth matched distortion value, the fifth matched distortion value, and the sixth matched distortion value that correspond to the backward prediction block, and determine that the backward prediction block, the second prediction block, the third prediction block, the fourth prediction block, the fifth prediction block, or the sixth prediction block that each corresponds to the second smallest matched distortion value is the target prediction block.

In a possible implementation, the second prediction block, the third prediction block, the fourth prediction block, the fifth prediction block, and the sixth prediction block are respectively prediction block obtained by shifting the first prediction block upward, downward, leftward, rightward, and in the diagonal direction in the reference frame based on first sample accuracy.

The calculation module 42 is further configured to, when the second matched distortion value, the third matched distortion value, the fourth matched distortion value, the fifth matched distortion value, and the sixth matched distortion value are all greater than or equal to the first matched distortion value, calculate a seventh matched distortion value between a seventh prediction block and the combined prediction block, an eighth matched distortion value between an eighth prediction block and the combined prediction block, a ninth matched distortion value between a ninth prediction block and the combined prediction block, a tenth matched distortion value between a tenth prediction block and the combined prediction block, and an eleventh matched distortion value between an eleventh prediction block and the combined prediction block, where the seventh prediction block, the eighth prediction block, the ninth prediction block, the tenth prediction block, and the eleventh prediction block are respectively prediction block obtained by shifting the first prediction block upward, downward, leftward, rightward, and in the diagonal direction in the reference frame based on second sample accuracy.

The first determining module 43 is specifically configured to, when the first prediction block is the forward prediction block, determine a first smallest matched distortion value among the first matched distortion value, the seventh matched distortion value, the eighth matched distortion value, the ninth matched distortion value, the tenth matched distortion value, and the eleventh matched distortion value, determine that the forward prediction block, the seventh prediction block, the eighth prediction block, the ninth prediction block, the tenth prediction block, or the eleventh prediction block that each corresponds to the first smallest matched distortion value is the target prediction block, when the first prediction block is the backward prediction block, determine a second smallest matched distortion value among the first matched distortion value, the seventh matched distortion value, the eighth matched distortion value, the ninth matched distortion value, the tenth matched distortion value, and the eleventh matched distortion value, and determine that the backward prediction block, the seventh prediction block, the eighth prediction block, the ninth prediction block, the tenth prediction block, or the eleventh prediction block that each corresponds to the second smallest matched distortion value is the target prediction block.

In a possible implementation, the first sample accuracy is integer sample accuracy, and the second sample accuracy is half-sample accuracy.

In a possible implementation, P0[n] is a sample value of a sample in the sampled first prediction block, second prediction block, third prediction block, fourth prediction block, fifth prediction block, or sixth prediction block, P1[n] is a sample value of a sample in the sampled combined prediction block, corresponding positions of P0[n] and P1[n] in the two sampled prediction blocks are the same, and L is a quantity of samples in a sampled prediction block.

The apparatus in this embodiment may be configured to perform the method in Embodiment 4. A specific implementation and a technical effect are similar to those of the method in Embodiment 4, and details are not described herein again. It should be noted that the combination module 41, the calculation module 42, the first determining module 43, and the second determining module 44 may be applied to a motion vector determining process on an encoder side or a decoder side.

The functional modules in Embodiment 5 to Embodiment 8 may be implemented by an encoder, a decoder, or a processor. The processor may be implemented as one or more central processing unit (CPU) chips, a core (for example, a multi-core processor), a field-programmable gate array (FPGA), an application-specific integrated circuit (ASIC), and a digital signal processor (DSP).

Figure 17:
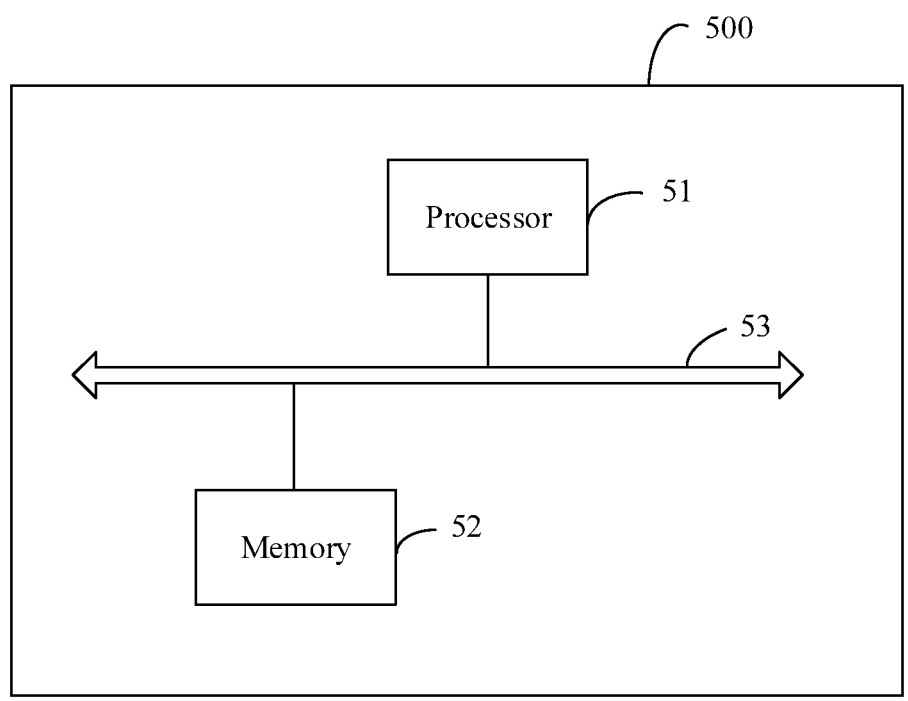
FIG. 17 is a schematic diagram of a video coding device according to Embodiment 9 of this application.

FIG. 17 is a schematic diagram of a video coding device according to Embodiment 9 of this application. As shown in FIG. 17, a video coding device 500 in this embodiment includes a processor 51, a memory 52, and a bus system 53. The processor 51 and the memory 52 are connected through the bus system 53. The memory 52 is configured to store an instruction. The processor 51 is configured to execute the instruction stored in the memory 52. The memory 52 of the video coding device 500 stores program code, and the processor 51 may invoke the program code stored in the memory 52, to perform the method in any one of Embodiment 1 to Embodiment 4 of this application. For a specific implementation, refer to descriptions in the method embodiments. Details are not described herein again.

In this embodiment of this application, the processor 51 may be a CPU, or the processor 51 may be another general-purpose processor, a DSP, an ASIC, an FPGA or another programmable logic device, a discrete gate or transistor logic device, a discrete hardware assembly, or the like. The general-purpose processor may be a microprocessor, any conventional processor, or the like.

The memory 52 may include a read-only memory (ROM) device or a random-access memory (RAM) device. Any other appropriate type of storage device may alternatively be used as the memory 52. The memory 52 may include code and data that are accessed by the processor 51 through the bus system 53.

The bus system 53 may further include a power bus, a control bus, a status signal bus, and the like, in addition to a data bus. However, for clear description, various types of buses in the figure are marked as the bus system 53.

Optionally, the video coding device 500 may further include one or more output devices, for example, a display. In an example, the display may be a touch sensitive display that combines the display and a touch sensitive unit that is operable to sense a touch input. The display may be connected to the processor 51 through the bus system 53.

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motion vector determining method, comprising:
    calculating a first matched distortion value between a forward prediction block of a current block and a backward prediction block of the current block;
    calculating only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, wherein the first prediction block, the second prediction block, the third prediction block, and the fourth prediction block are respectively prediction blocks are obtained from a first motion of the forward prediction block upward, downward, leftward, and rightward in a forward reference frame, and wherein the fifth prediction block, the sixth prediction block, the seventh prediction block, and the eighth prediction block are respectively prediction blocks obtained from a second motion of the backward prediction block downward, upward, rightward, and leftward in a backward reference frame;
    determining a target forward prediction block and a target backward prediction block based on a value relationship between the first matched distortion value, the second matched distortion value, the third matched distortion value, the fourth matched distortion value, and the fifth matched distortion value; and
    determining a target motion vector of the current block based on the target forward prediction block and the target backward prediction block.

2. The motion vector determining method of claim 1, further comprising:
    determining a smallest matched distortion value among the first matched distortion value, the second matched distortion value, the third matched distortion value, the fourth matched distortion value, and the fifth matched distortion value;
    determining that the smallest matched distortion value corresponds to a first block and a second block, wherein the first block is one of the forward prediction block, the first prediction block, the second prediction block, the third prediction block, or the fourth prediction block, and wherein the second block is one of the backward prediction block, the fifth prediction block, the sixth prediction block, the seventh prediction block, or the eighth prediction block;

determining that the first block is the target forward prediction block; and determining that the second block is the target backward prediction block.

3. The motion vector determining method of claim 1, wherein the first prediction block, the second prediction block, the third prediction block, and the fourth prediction block are respectively prediction blocks obtained from a third motion of the forward prediction block upward, downward, leftward, and rightward in the forward reference frame based on first sample accuracy, wherein the fifth prediction block, the sixth prediction block, the seventh prediction block, and the eighth prediction block are respectively prediction blocks obtained from a fourth motion of the backward prediction block downward, upward, rightward, and leftward in the backward reference frame based on the first sample accuracy, and wherein determining the target forward prediction block and the target backward prediction block comprises:

when the second matched distortion value, the third matched distortion value, the fourth matched distortion value, and the fifth matched distortion value are all greater than or equal to the first matched distortion value, calculating only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block, wherein the ninth prediction block, the tenth prediction block, the eleventh prediction block, and the twelfth prediction block are respectively prediction blocks obtained from a fifth motion of the forward prediction block upward, downward, leftward, and rightward in the forward reference frame based on second sample accuracy, wherein the thirteenth prediction block, the fourteenth prediction block, the fifteenth prediction block, and the sixteenth prediction block are respectively prediction blocks obtained from a sixth motion of the backward prediction block downward, upward, rightward, and leftward in the backward reference frame based on the second sample accuracy;

determining a smallest matched distortion value among the first matched distortion value, the sixth matched distortion value, the seventh matched distortion value, the eighth matched distortion value, and the ninth matched distortion value;

determining that the smallest matched distortion value corresponds to a first block and a second block, wherein the first block is one of the forward prediction block, the ninth prediction block, the tenth prediction block, the eleventh prediction block, or the twelfth prediction block, and wherein the second block is one of the backward prediction block, the thirteenth prediction block, the fourteenth prediction block, the fifteenth prediction block, or the sixteenth prediction block;

determining that the first block is the target forward prediction block; and determining that the second block is the target backward prediction block.

4. The motion vector determining method of claim 3, wherein any one of the first matched distortion value, the second matched distortion value, the third matched distortion value, the fourth matched distortion value, the fifth matched distortion value, the sixth matched distortion value, the seventh matched distortion value, the eighth matched distortion value, or the ninth matched distortion value comprises a sum of absolute differences (SAD) between two prediction blocks, wherein the SAD is based on the following equation:

$$SAD = \Sigma_{n=0}^{n=L-1}[abs(P0[n]-P1[n]-K)],$$

wherein P1[n] is a first sample value of a first sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block when P0[n] is a second sample value of a second sample in the forward prediction block, the first prediction block, the second prediction block, the third prediction block, the fourth prediction block, the ninth prediction block, the tenth prediction block, the eleventh prediction block, or the twelfth prediction block, wherein a first plurality of corresponding positions of P0[n] and P1[n] are a first same position, wherein L is a quantity of samples in a prediction block, wherein K is an average between the two prediction blocks.

5. The motion vector determining method of claim 4, wherein the first sample accuracy is integer sample accuracy, and wherein the second sample accuracy is half-sample accuracy.

6. A motion vector determining apparatus, comprising:
a processor; and
a memory coupled to the processor and configured to store instructions that, when executed by the processor, cause the motion vector determining apparatus to be configured to:
calculate a first matched distortion value between a forward prediction block of a current block and a backward prediction block of the current block;
calculate only a second matched distortion value between a first prediction block and a fifth prediction block, a third matched distortion value between a second prediction block and a sixth prediction block, a fourth matched distortion value between a third prediction block and a seventh prediction block, and a fifth matched distortion value between a fourth prediction block and an eighth prediction block, wherein the first prediction block, the second prediction block, the third prediction block, and the fourth prediction block are respectively prediction blocks obtained from a first motion of the forward prediction block upward, downward, leftward, and rightward in a forward reference frame, and wherein the fifth prediction block, the sixth prediction block, the seventh prediction block, and the eighth prediction block are respectively prediction blocks obtained from a second motion of the backward prediction block downward, upward, rightward, and leftward in a backward reference frame;
determine a target forward prediction block and a target backward prediction block based on a value relationship between the first matched distortion value, the second matched distortion value, the third matched distortion value, the fourth matched distortion value, and the fifth matched distortion value; and determine a target motion vector of the current block based on the target forward prediction block and the target backward prediction block.

7. The motion vector determining apparatus of claim 6, wherein the instructions further cause the motion vector determining apparatus to be configured to:

determine a smallest matched distortion value among the first matched distortion value, the second matched distortion value, the third matched distortion value, the fourth matched distortion value, and the fifth matched distortion value;

determine that the smallest matched distortion value corresponds to a first block and a second block, wherein the first block is one of the forward prediction block, the first prediction block, the second prediction block, the third prediction block, or the fourth prediction block, and wherein the second block is one of the backward prediction block, the fifth prediction block, the sixth prediction block, the seventh prediction block, or the eighth prediction block;

determine that the first block is the target forward prediction block; and determine that the second block is the target backward prediction block.

8. The motion vector determining apparatus of claim 6, wherein the first prediction block, the second prediction block, the third prediction block, and the fourth prediction block are respectively prediction blocks obtained from a third the forward prediction block upward, downward, leftward, and rightward in the forward reference frame based on first sample accuracy, and wherein the fifth prediction block, the sixth prediction block, the seventh prediction block, and the eighth prediction block are respectively prediction blocks obtained from a fourth motion of the backward prediction block downward, upward, rightward, and leftward in the backward reference frame based on the first sample accuracy, wherein the instructions further cause the processor to be configured to:

when the second matched distortion value, the third matched distortion value, the fourth matched distortion value, and the fifth matched distortion value are all greater than or equal to the first matched distortion value, calculate only a sixth matched distortion value between a ninth prediction block and a thirteenth prediction block, a seventh matched distortion value between a tenth prediction block and a fourteenth prediction block, an eighth matched distortion value between an eleventh prediction block and a fifteenth prediction block, and a ninth matched distortion value between a twelfth prediction block and a sixteenth prediction block, wherein the ninth prediction block, the tenth prediction block, the eleventh prediction block, and the twelfth prediction block are respectively prediction blocks obtained from a fifth motion of the forward prediction block upward, downward, leftward, and rightward in the forward reference frame based on second sample accuracy, and wherein the thirteenth prediction block, the fourteenth prediction block, the fifteenth prediction block, and the sixteenth prediction block are respectively prediction blocks obtained from a sixth motion of the backward prediction block downward, upward, rightward, and leftward in the backward reference frame based on the second sample accuracy;

determine a smallest matched distortion value among the first matched distortion value, the sixth matched distortion value, the seventh matched distortion value, the eighth matched distortion value, and the ninth matched distortion value;

determine that the smallest matched distortion value corresponds to a first block and a second block, wherein the first block is one of the forward prediction block, the ninth prediction block, the tenth prediction block, the eleventh prediction block, or the twelfth prediction block, and wherein the second block is one of the backward prediction block, the thirteenth prediction block, the fourteenth prediction block, the fifteenth prediction block, or the sixteenth prediction block;

determine that the first block is the target forward prediction block; and determine that the second block is the target backward prediction block.

9. The motion vector determining apparatus of claim 8, wherein any one of the first matched distortion value, the second matched distortion value, the third matched distortion value, the fourth matched distortion value, the fifth matched distortion value, the sixth matched distortion value, the seventh matched distortion value, the eighth matched distortion value, or the ninth matched distortion value comprises a sum of absolute differences (SAD) between two prediction blocks, wherein the SAD is based on the following equation:

$$SAD=\Sigma_{n=0}^{n=L-1}[abs(P0[n]-P1[n]-K)],$$

wherein P1[n] is a first sample value of a first sample in the backward prediction block, the fifth prediction block, the sixth prediction block, the seventh prediction block, the eighth prediction block, the thirteenth prediction block, the fourteenth prediction block, the fifteenth prediction block, or the sixteenth prediction block when P0[n] is a second sample value of a second sample in the forward prediction block, the first prediction block, the second prediction block, the third prediction block, the fourth prediction block, the ninth prediction block, the tenth prediction block, the eleventh prediction block, or the twelfth prediction block, wherein a first plurality of corresponding positions of P0[n] and P1[n] are the same, wherein L is a quantity of samples in a prediction block, wherein K is an average between the two prediction blocks.

10. The motion vector determining apparatus of claim 9, wherein the first sample accuracy is integer sample accuracy, and wherein the second sample accuracy is half-sample accuracy.

11. A motion vector determining method, comprising:

calculating a first matched distortion value between a forward prediction block of a current block and a backward prediction block of the current block;

calculating a second matched distortion value between a first prediction block and a sixth prediction block, a third matched distortion value between a second prediction block and a seventh prediction block, a fourth matched distortion value between a third prediction block and an eighth prediction block, a fifth matched distortion value between a fourth prediction block and a ninth prediction block, and a sixth matched distortion value between a fifth prediction block and a tenth prediction block, wherein the first prediction block, the second prediction block, the third prediction block, the fourth prediction block, and the fifth prediction block are respectively prediction blocks obtained from a first motion of the forward prediction block upward, downward, leftward, rightward, and in a diagonal direction in a forward reference frame, wherein the sixth prediction block, the seventh prediction block, the eighth prediction block, the ninth prediction block, and the tenth prediction block are respectively prediction blocks are obtained from a second motion of the backward prediction block downward, upward, rightward, leftward, and in a reverse direction of the diagonal direction in a backward reference frame, and wherein any one of the first matched distortion value, the second matched distortion value, the third matched distortion value, the fourth matched distortion value, the fifth matched distortion value, or the sixth matched distortion value comprises a sum of absolute differences sum of absolute differences (SAD) between two prediction blocks;

determining a target forward prediction block and a target backward prediction block based on a value relationship between the first matched distortion value, the second matched distortion value, the third matched distortion value, the fourth matched distortion value, the fifth matched distortion value, and the sixth matched distortion value; and determining a target motion vector of the current block based on the target forward prediction block and the target backward prediction block.

12. The motion vector determining method of claim 11, further comprising:

determining a smallest matched distortion value among the first matched distortion value, the second matched distortion value, the third matched distortion value, the fourth matched distortion value, and the fifth matched distortion value;

determining that the smallest matched distortion value corresponds to a first block and a second block;

determining that the second block is the target forward prediction block; and determining that the first block is the target backward prediction block.

13. The motion vector determining method of claim 12, wherein the first block is one of the forward prediction block, the first prediction block, the second prediction block, the third prediction block, or the fourth prediction block.

14. The motion vector determining method of claim 12, wherein the second block is one of the backward prediction block, the fifth prediction block, the sixth prediction block, the seventh prediction block, or the eighth prediction block.

15. The motion vector determining method of claim 12, wherein the SAD is based on the following equation:

$$SAD=\Sigma_{n=0}^{n=L-1}[abs(P0[n]-P1[n]-K)],$$

wherein P1[n] is a first sample value of a first sample in a sampled backward prediction block, the sixth prediction block, the seventh prediction block, the eighth prediction block, the ninth prediction block, or the tenth prediction block when P0[n] is a second sample value of a second sample in the forward prediction block, the first prediction block, the second prediction block, the third prediction block, the fourth prediction block, or the fifth prediction block, wherein a first plurality of corresponding positions of P0[n] and P1[n] are a first same position, wherein L is a quantity of samples in a sampled prediction block.

16. The motion vector determining method of claim 12, wherein when the diagonal direction is a top-left direction, a bottom-left direction, a top-right direction, or a bottom-right direction, a reverse direction of the diagonal direction is correspondingly the bottom-right direction, the top-right direction, the bottom-left direction, or the top-left direction.

17. The motion vector determining method of claim 11, wherein the first prediction block, the second prediction block, the third prediction block, and the fourth prediction block are respectively prediction blocks obtained from a third motion of the forward prediction block upward, downward, leftward, and rightward in the forward reference frame based on first sample accuracy, wherein the fifth prediction block, the sixth prediction block, the seventh prediction block, and the eighth prediction block are respectively prediction blocks obtained from a fourth motion of the backward prediction block downward, upward, rightward, and leftward in the backward reference frame based on the first sample accuracy.

18. The motion vector determining method of claim 17, wherein the first sample accuracy is integer sample accuracy.

19. The motion vector determining method of claim 4, wherein K is based on the following equation:

$$K=(\Sigma_{0 \leq i M<, 0 \leq j<N}P0[i][i]-\Sigma_{0 \leq i M<, 0 \leq j<N}P1[i][j])/M*N,$$

wherein M is a first quantity of samples in a sampled prediction block in a width direction, wherein N is a second quantity of samples in the sampled prediction block in a height direction, wherein i and j are sample numbers, wherein P1[i][j] is correspondingly a third sample value of a third sample in a sampled backward prediction block, the fifth prediction block, the sixth prediction block, the seventh prediction block, the eighth prediction block, the thirteenth prediction block, the fourteenth prediction block, the fifteenth prediction block, or the sixteenth prediction block when P0[i][j] is a fourth sample value of a fourth sample in a sampled forward prediction block, the first prediction block, the second prediction block, the third prediction block, the fourth prediction block, the ninth prediction block, the tenth prediction block, the eleventh prediction block, or the twelfth prediction block, and wherein a second plurality of corresponding positions of P0[i][j] and P1[i][j] are a second same position.

20. The motion determining apparatus of claim 9, wherein K is based on the following equation:

$$K=(\Sigma_{0 \leq i M<, 0 \leq j<N}P0[i][i]-\Sigma_{0 \leq i M<, 0 \leq j<N}P1[i][j])/M*N,$$

wherein M is a first quantity of samples in a sampled prediction block in a width direction, wherein N is a second quantity of samples in the sampled prediction block in a height direction, wherein i and j are sample numbers, wherein P1[i][j] is correspondingly a third sample value of a third sample in a sampled backward prediction block, the fifth prediction block, the sixth prediction block, the seventh prediction block, the eighth prediction block, the thirteenth prediction block, the fourteenth prediction block, the fifteenth prediction block, or the sixteenth prediction block when P0[i][j] is a fourth sample value of a fourth sample in a sampled forward prediction block, the first prediction block, the second prediction block, the third prediction block, the fourth prediction block, the ninth prediction block, the tenth prediction block, the eleventh prediction block, or the twelfth prediction block, and wherein a second plurality of corresponding positions of P0[i][j] and P1[i][j] are a second same position.

* * * * *

UNITED STATES PATENT AND TRADEMARK OFFICE
CERTIFICATE OF CORRECTION

PATENT NO. : 11,259,042 B2
APPLICATION NO. : 17/206767
DATED : February 22, 2022
INVENTOR(S) : Xu Chen and Jianhua Zheng It is certified that error appears in the above-identified patent and that said Letters Patent is hereby corrected as shown below:

In the Claims

Claim 15, Column 63, Line 48: "[abs(P0[n]-P1[n]-K]" should read "[abs(P0[n]-P1[n])]"

Claim 19, Column 64, Line 21: "P0[i][i]" should read "P0[i][j]"

Claim 20, Column 44, Line 21: "P0[i][i]" should read "P0[i][j]"

Signed and Sealed this
Fourteenth Day of June, 2022

Katherine Kelly Vidal
Director of the United States Patent and Trademark Office